United States Patent
Yang et al.

(10) Patent No.: US 12,067,765 B2
(45) Date of Patent: Aug. 20, 2024

(54) DISTRIBUTED COMPUTING NETWORK TO PERFORM SIMULTANEOUS LOCALIZATION AND MAPPING

(71) Applicant: Pony AI Inc., Grand Cayman (KY)

(72) Inventors: Mengda Yang, Sunnyvale, CA (US); Ruimeng Shi, Beijing (CN)

(73) Assignee: Pony AI Inc., Grand Cayman (KY)

( * ) Notice: Subject to any disclaimer, the term of this patent is extended or adjusted under 35 U.S.C. 154(b) by 434 days.

(21) Appl. No.: 17/196,761

(22) Filed: Mar. 9, 2021

(65) Prior Publication Data

US 2022/0292290 A1 Sep. 15, 2022

(51) Int. Cl.
| | | |
|---|---|---|
| G06K 9/00 | (2022.01) | |
| G06F 18/214 | (2023.01) | |
| G06K 9/62 | (2022.01) | |
| G06T 1/20 | (2006.01) | |
| G06T 7/73 | (2017.01) | |
| G06V 10/94 | (2022.01) | |
| G06V 20/56 | (2022.01) | |

(52) U.S. Cl.
CPC ............ *G06V 10/95* (2022.01); *G06F 18/214* (2023.01); *G06T 1/20* (2013.01); *G06T 7/73* (2017.01); *G06V 20/56* (2022.01); *G06T 2207/10028* (2013.01)

(58) Field of Classification Search
CPC .......... G06V 10/95; G06V 20/56; G06T 7/73; G06T 1/20; G06T 2207/10028; G06F 18/214
See application file for complete search history.

(56) References Cited

U.S. PATENT DOCUMENTS

| | | | | |
|---|---|---|---|---|
| 11,164,051 | B2* | 11/2021 | Deegan | G06T 7/33 |
| 11,170,299 | B2* | 11/2021 | Kwon | G06V 20/56 |
| 11,200,685 | B2* | 12/2021 | Kong | G06T 17/005 |
| 11,282,210 | B2* | 3/2022 | Zeng | G06V 20/64 |
| 11,443,437 | B2* | 9/2022 | Chen | G06T 7/187 |
| 11,465,642 | B2* | 10/2022 | Xiao | B60W 60/001 |
| 11,521,329 | B2* | 12/2022 | He | G06T 7/33 |
| 11,676,253 | B2* | 6/2023 | Ponto | G06T 5/90 |
| | | | | 382/254 |

\* cited by examiner

*Primary Examiner* — Gregory M Desire
(74) *Attorney, Agent, or Firm* — Sheppard, Mullin, Richter & Hampton LLP; Xin Xie

(57) ABSTRACT

An apparatus includes a processing node of a distributed computing platform. The processing node communicates with other processing nodes over one or more networks. The processing node may receive frames of point clouds at a processing node of a distributed computing platform, determine a subset of the frames as key frames based at least in part on distances travelled between captures of the respective frames, and allocate tasks of processing the key frames to processing subnodes based at least in part on estimated processing demands of the key frames and processing capabilities of each of the processing subnodes.

20 Claims, 17 Drawing Sheets

DISTRIBUTED COMPUTING NETWORK TO PERFORM SIMULTANEOUS LOCALIZATION AND MAPPING

BACKGROUND

In order to address the shortcomings of GPS, during the past two decades, simultaneous localization and mapping (SLAM) has been used to map an environment. Due to a growth of SLAM, and an increasing complexity of processing requirements, more powerful and efficient computing systems or pipelines are required to perform SLAM processing.

SUMMARY

Described herein, in some embodiments, is a distributed network, platform, or pipeline that efficiently processes and routes data to perform SLAM computations and generates a high-definition (HD) map, such as a grid map. In some embodiments, the distributed network or pipeline includes multiple processing nodes, each of which may include one or more hardware processors, instructions to perform processing tasks, and/or memory or other storage. The multiple processing nodes may communicate with one another via one or more networks. A processing node of the multiple processing nodes may be configured to receive frames of point clouds at a processing node of a distributed computing platform, determine a subset of the frames as key frames based at least in part on distances travelled between captures of the respective frames, and allocate tasks of processing the key frames to processing subnodes based at least in part on estimated processing demands of the key frames and processing capabilities of each of the processing subnodes. Thus, key frames may be required to be processed by the processing subnodes, while frames that do not fall under, or fail to satisfy criteria of, key frames may be discarded and not require processing in order to save processing resources.

In some embodiments, the allocation of tasks comprises: allocating key frames having a range of timestamps to a first processing subnode; and allocating second key frames having a second range of timestamps to a second processing subnode.

In some embodiments, the determination of the key frames comprises determining a frame to be a key frame in response determining that a position corresponding to a capture of the frame deviates from positions corresponding to captures of remaining frames by more than a threshold distance.

In some embodiments, the tasks of processing the key frames include determining loop closure constraints based on common features identified in the key frames, the loop closure constraints indicating that a pair of the key frames were captured at locations within a threshold distance of each other.

In some embodiments, following the determination of the loop closure constraints, the loop closure constraints are transmitted to a downstream node, the downstream node aggregating the loop closure constraints and determining: positions at which each of the key frames were captured based on the aggregated loop closure constraints, and locations of the common features.

In some embodiments, following the determination of the positions at which each of the key frames were captured, the determined positions are transmitted to the processing subnodes, the processing subnodes generating partial static maps from the respective allocated keyframes based on the transmitted determined positions.

In some embodiments, the generated partial static maps are transmitted to the downstream node, the downstream node aggregating the generated partial static maps to generate an integrated static map.

In some embodiments, the determination of key frames is based on an identification of features and contexts of the features in the frames using a trained machine learning model, and training datasets used to train the machine learning model comprise: a first dataset including features and contexts that would result in a frame being determined to be a key frame; and a second dataset including second features and second contexts that would result in a frame being determined to be a non-key frame.

In some embodiments, the processing demands of the key frames are determined at least in part by respective degrees of reliability of position and attitude estimations obtained from the key frames.

Various embodiments of the present disclosure also provide a method implemented by the processing nodes and/or other processing nodes as described above. Various embodiments of the present disclosure also provide instructions, stored in a memory or non-transitory storage media, that cause processors in each of the processing nodes to perform the methods above.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1A:
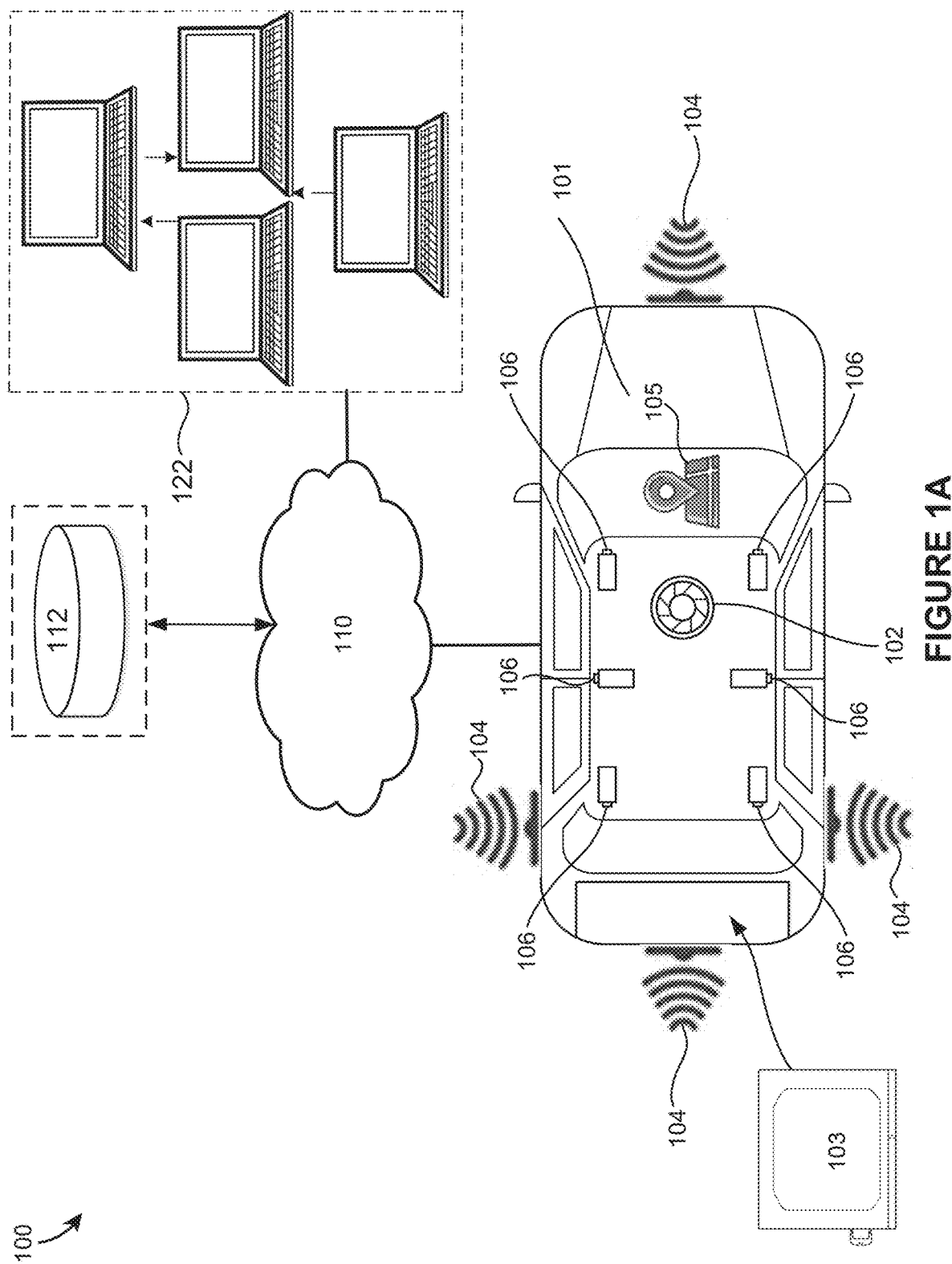
FIG. 1A illustrates an example environment of a system that acquires sensor data and maps an environment using a distributed computing platform, according to an embodiment of the present disclosure. In particular, the distributed computing platform may be remote from a vehicle that acquires the sensor data.

As SLAM techniques and capabilities become more powerful and complex, the computing demands to perform such techniques also become greater. SLAM techniques are being used to map larger regions and acquire finer details in each region. In particular, data may be repeatedly collected in a common region in order to obtain better coverage rate and/or accuracy of that region from different angles or perspectives. Due in part to such developments, computation and storage requirements of SLAM may require more than a single machine because of hardware limitations and time constraints in the scenario of using only a single machine.

Embodiments described herein provide a distributed computing environment that includes numerous processing entities, computers, centers or nodes (hereinafter "nodes"), in which processing tasks of SLAM are divided among the different nodes. Each of the nodes may also include its own local memory. The tasks cannot simply be split up randomly among the different nodes because of geometry mismatches when the tasks are separated. The different nodes may include a first node, a second node, and a third node. The first node may include a scheduling node that determines a division or allocation of computing tasks at the second node. The second node may include distinct subnodes, for example, that each process a segment of the computing tasks. Each of the distinct subnodes may also include its own local memory. For example, the first node may determine which computing tasks to allocate to each of the distinct subnodes. The third node may include a combining or aggregating node that combines outputs from the distinct subnodes and performs SLAM optimization. The third node may transmit the combined outputs and the SLAM optimization back to the second node to perform post processing, which associates the combined outputs with corresponding poses. Thus, the distinct subnodes may split up time consuming tasks to be performed in parallel and reduce a total time requirement of processing.

Such a distributed computing environment may generate a HD map, such as a grid map. Generating such a HD map may entail integrating and stitching together different point clouds after determining a position and attitude (e.g., orientation or angle) of each of the different point clouds. This HD map may be used by a vehicle, such as an autonomous or semi-autonomous vehicle, to reliably perform navigation. For example, the vehicle may detect or determine a presence of different objects or entities in the surrounding environment to assist the vehicle, or another vehicle, in performing navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control. Additionally, the generated city-scale map may supplement current HD and other maps to be used on the vehicle or on other vehicles.

FIG. 1A illustrates an example environment 100 that includes a distributed computing system, network, or pipeline (hereinafter "distributed computing system") 122 to generate a high-definition map, according to an embodiment of the present disclosure. In FIG. 1A, a vehicle 101 such as an autonomous vehicle may include sensors such as Lidar sensors 102, an inertial measurement unit (IMU) 103, radar sensors 104, a GPS or GNSS sensor (hereinafter "GPS sensor") 105, cameras 106, accelerometers, gyroscopes, magnetometers, and far infrared (FIR) sensors to detect and identify objects in a surrounding environment. In some embodiments, the IMU 103 may include accelerometers and gyroscopes, and optionally, magnetometers. Sensor data may include pictorial or image data such as pictures or videos, audio data, audiovisual data, timestamp data, and/or other data indicating a position and/or pose of the vehicle 101 captured in either real-time or with a time delay. For example, data from the Lidar sensors 102, the IMU 103, the GPS sensor 105, and the timestamp data can be used to localize the vehicle 101 at different times while generating a map of the environment. The vehicle 101 can also include myriad actuators to propel and navigate the vehicle 101 in the surrounding based on the generated map. Such actuators may include, for example, any suitable electro-mechanical devices or systems such as actuators including drive-by-wire (DBW) actuators to control a throttle response, a braking action, a steering action, etc.

In some embodiments, the distributed computing system 122 may be located remotely from the vehicle 101, while receiving communications such as the sensor data from the vehicle 101. The environment 100 may also include one or more servers 112 accessible to the distributed computing system 122. The one or more servers 112 may store frames of data from the sensors of the vehicle 101. In some embodiments, the one or more servers 112 may store integrated or fused data from the sensors. In some embodiments, the one or more servers 112 may include point clouds which may be registered, or post-processed global navigation satellite system (GNSS)-inertial navigation system (INS) data. In some embodiments, the one or more servers 112 may store generated maps and/or map data from the distributed computing system 122. The one or more servers 112 may be accessible to the distributed computing system 122 either directly or over the communication network 110. In some instances, the one or more servers 112 may include federated data stores, databases, or any other type of data source from which data may be stored and retrieved, for example. In general, a user operating a computing device can interact with the distributed computing system 122 over the communication network 110, for example, through one or more graphical user interfaces and/or application programming interfaces. The distributed computing system 122 may include one or more processors such as a graphics processing unit (GPU) or a central processing unit (CPU). The distributed computing system 122 may include, for example, an integrated circuit containing a high-performance microprocessor or microcontroller such as a graphical processing unit (GPU) capable of executing algorithms that require processing large blocks of data (e.g., sensor data) in parallel, for example. In some example embodiments, the distributed computing system 122 may include multiple types of processing units (e.g., GPUs, CPUs, application-specific integrated circuits (ASICs), field-programmable gate arrays (FPGAs), etc.) potentially distributed across multiple computing devices and in communication with one another via one or more communication buses. The functions of the distributed computing system 122 will be described further in the subsequent figures and can be performed by any combination of hardware, software, and/or firmware. In certain example embodiments, each of the nodes or subnodes may include computer-executable instructions that, when executed by a processing circuit, cause one or more operations to be performed. In example embodiments, these nodes or subnodes may include customized computer-executable logic implemented within a customized computing machine such as a customized FPGA or ASIC. Each of the nodes or subnodes can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Figure 1B:
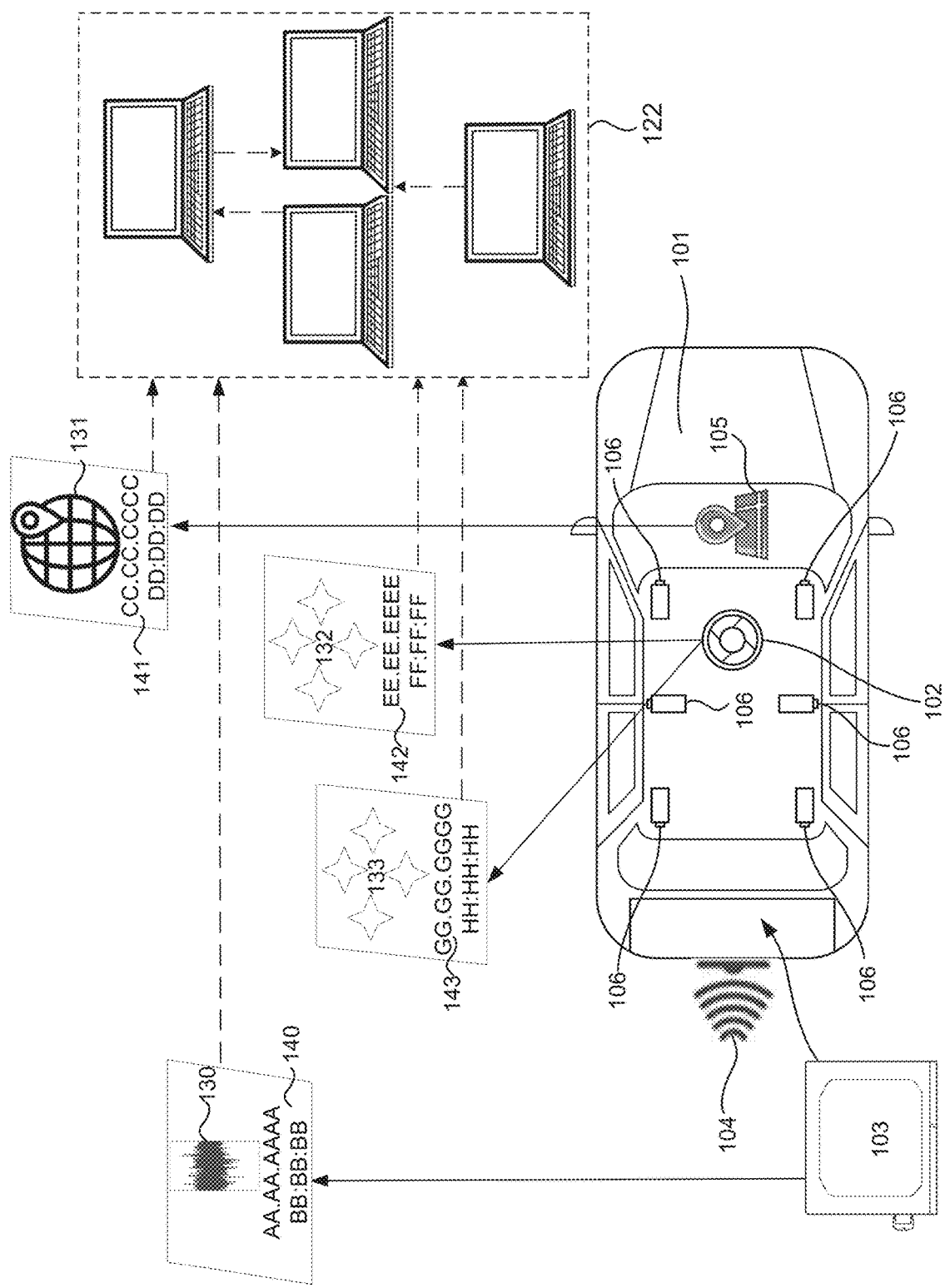
FIG. 1B illustrates a hybrid data flow and block diagram that depicts a system that acquires sensor data and maps an environment using a distributed computing platform, in accordance with an example embodiment of the present disclosure.

FIG. 1B illustrates a hybrid data flow and block diagram including the distributed computing system 122 that generates a HD map, in accordance with an example embodiment. The distributed computing system 122 will be described in more detail below. To briefly summarize, the distributed computing system 122, in FIG. 1B, may obtain, from the vehicle 101, Lidar point clouds such as point clouds 132 and 133 and odometry data 130 and 131 from the IMU 103 and the GPS sensor 105, respectively. The distributed computing system 122 may fuse or synchronize the odometry data 130 and 131 from the IMU 103 and the GPS sensor 105, respectively. The distributed computing system 122 may use the fused odometry data, together with the Lidar point clouds such as the point clouds 132 and 133, to determine data such as positions and/or orientations of the vehicle 101 at distinct times, and associated with captured Lidar point clouds at the respective distinct times. The distributed computing system 122 may infer or estimate loop closures and attempt to perform a point cloud registration on point clouds captured at times corresponding to the inferred or estimated loop closures. A loop closure may occur, for example, when two Lidar point clouds captured at distinct times are determined or estimated to be captured within a threshold distance of one another. Such a loop closure may be identified, for example, by common features present at similar positions and/or perspectives in the two Lidar point clouds. The distributed computing system 122 may, from the inferred or estimated loop closures, determine which point clouds to register, and infer or estimate further loop closures, for example, from common features identified in overlapping registered point clouds. The distributed computing system 122 may further construct constraints in each of the points and between the points that account for the fused odometry data and the inferred, or estimated, loop closures. For example, the constraints may require that the vehicle 101 be at or near a same location, within a threshold distance, at the times associated with the loop closures. As another example, the odometry constraints may require that the vehicle 101 be spaced apart at a given distance, within a threshold range of distances, between two distinct times. For example, an odometry constraint may require that the vehicle 101 be spaced apart by 500 meters at time 0 seconds and at time 5 seconds. The distributed computing system 122 may augment map data from the registered point clouds by stitching together partially overlapping point clouds based at least in part on the aforementioned constraints, such as the loop closure and the odometry constraints, along with post-processing constraints.

In FIG. 1B, the IMU 103 may generate the odometry data 130, such as, a relative movement, velocity, and/or acceleration of the vehicle 101 at distinct times, each of the distinct times having a timestamp 140. Meanwhile, the GPS sensor 105 may generate odometry data 131 such as absolute location and velocity data of the vehicle 101 at distinct times, each of the distinct times having a timestamp 141. The Lidar sensor 102 may generate the point clouds 132 and 133 containing Lidar data having respective timestamps 142 and 143. The point clouds 132 and 133 may include any of 2D, 3D, and/or 2D/3D fused Lidar data. In some embodiments, the Lidar sensor 102 may generate consecutive point clouds following a given time interval travelled by the vehicle 101. For example, the Lidar sensor 102 may generate point clouds after every 0.1 seconds. Two point clouds are shown for illustration, but any number of point clouds may be generated. The timestamps 142 and 143 may indicate same or different times.

Figure 2:
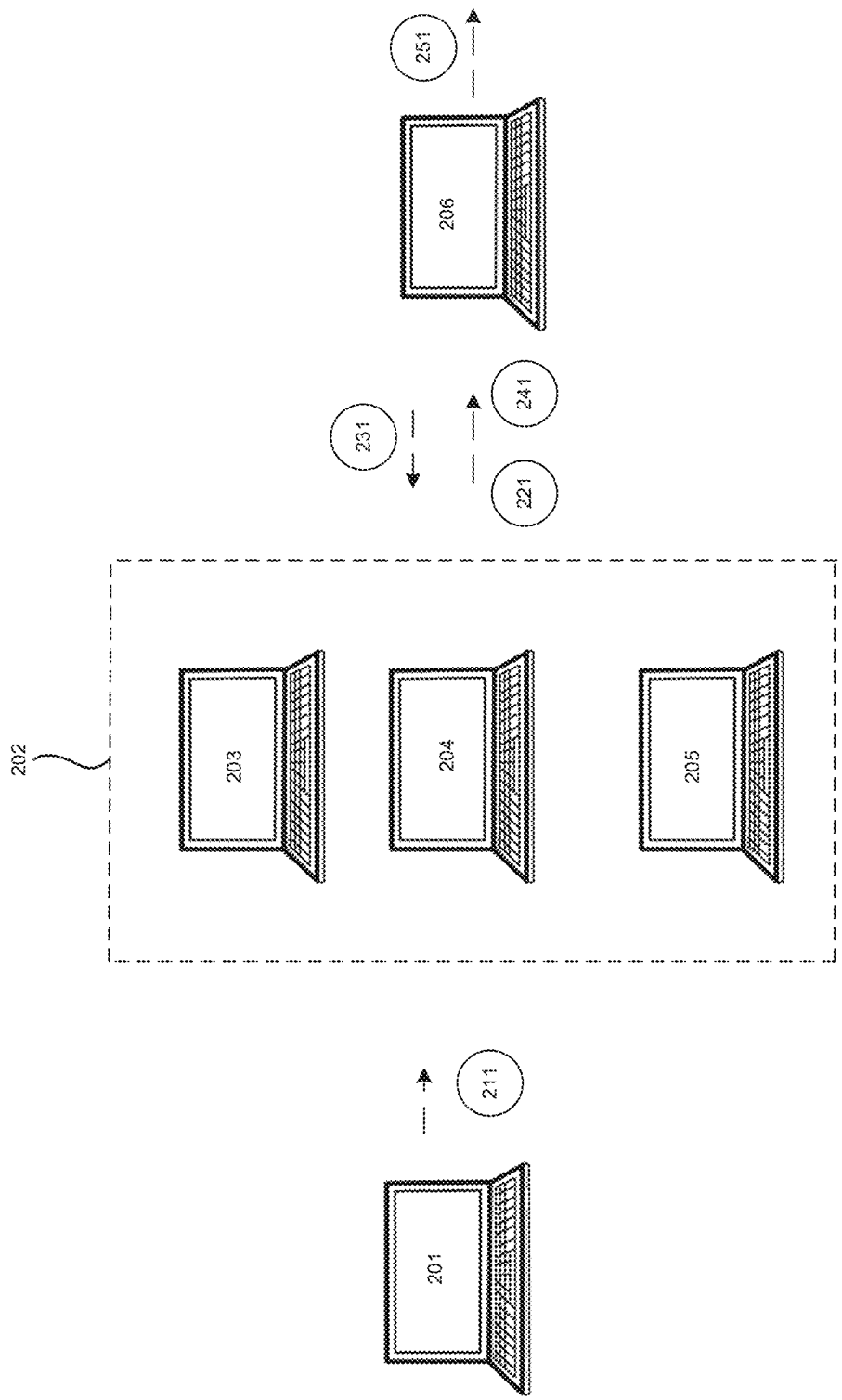
FIG. 2 illustrates an exemplary distributed computing platform shown in accordance with FIGS. 1A-1B, in accordance with an example embodiment of the present disclosure.

FIG. 2 illustrates an exemplary implementation of the distributed computing system 122 as shown in FIGS. 1A-1B. In some embodiments, as shown in FIG. 2, the distributed computing system 122 may include a first node 201, a second node 202, and a third node 206. The first node 201 may perform tasks 211, and transmit an output of the tasks 211 to the second node 202. The second node 202 may include sub-nodes 203, 204, and 205 that each perform tasks 221 on point clouds corresponding to a specific region or segment, and/or a specific range of timestamps. Outputs from the tasks 221 are transmitted to the third node 206, which aggregates the outputs. The third node 206 may perform tasks 231 and transmit an output of the tasks 231 to the second node 202 for further processing. Each of the sub-nodes 203, 204, and 205 may perform tasks 241 and transmit an output of the tasks 241 to the third node 206, which performs tasks 251 that include aggregating the output of the tasks 241. Any number of separate computing devices and/or hardware processors may be included in each of the first node 201, the second node 202, and the third node 206. In some embodiments, the first node 201 and the third node 206 may be combined into a single node, meaning that the functions of the first node 201 and the third node 206 may be performed by a single node. The tasks 211, 221, 231, 241, and 251 are described in further detail below in FIGS. 3A-3B and 4-12.

Figure 3A:
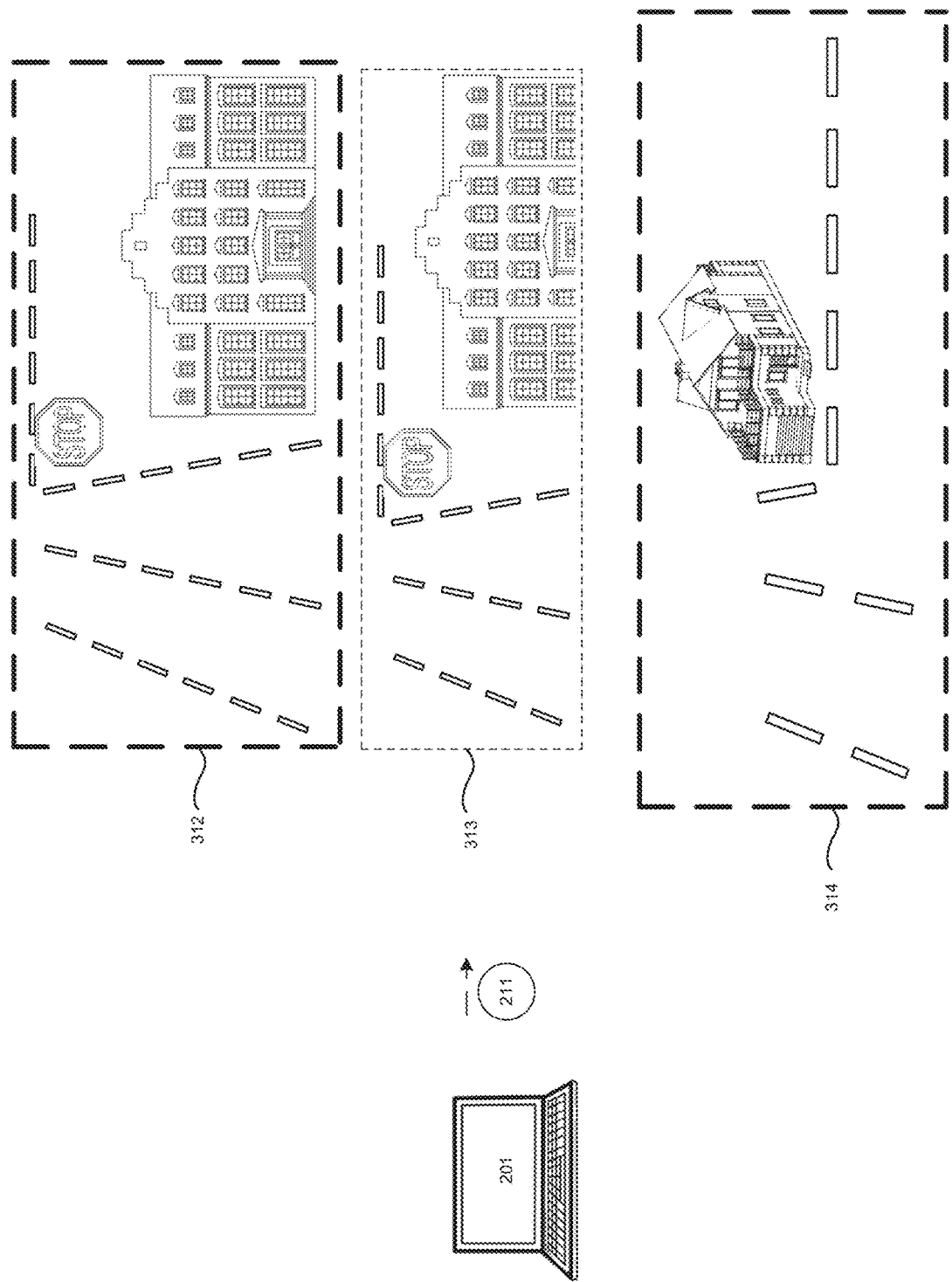
FIGS. 3A-3B and 4 illustrate an implementation of a component, a first processing node or first node, of the distributed computing platform shown in accordance with FIGS. 1A-1B and 2.
Figure 3B:
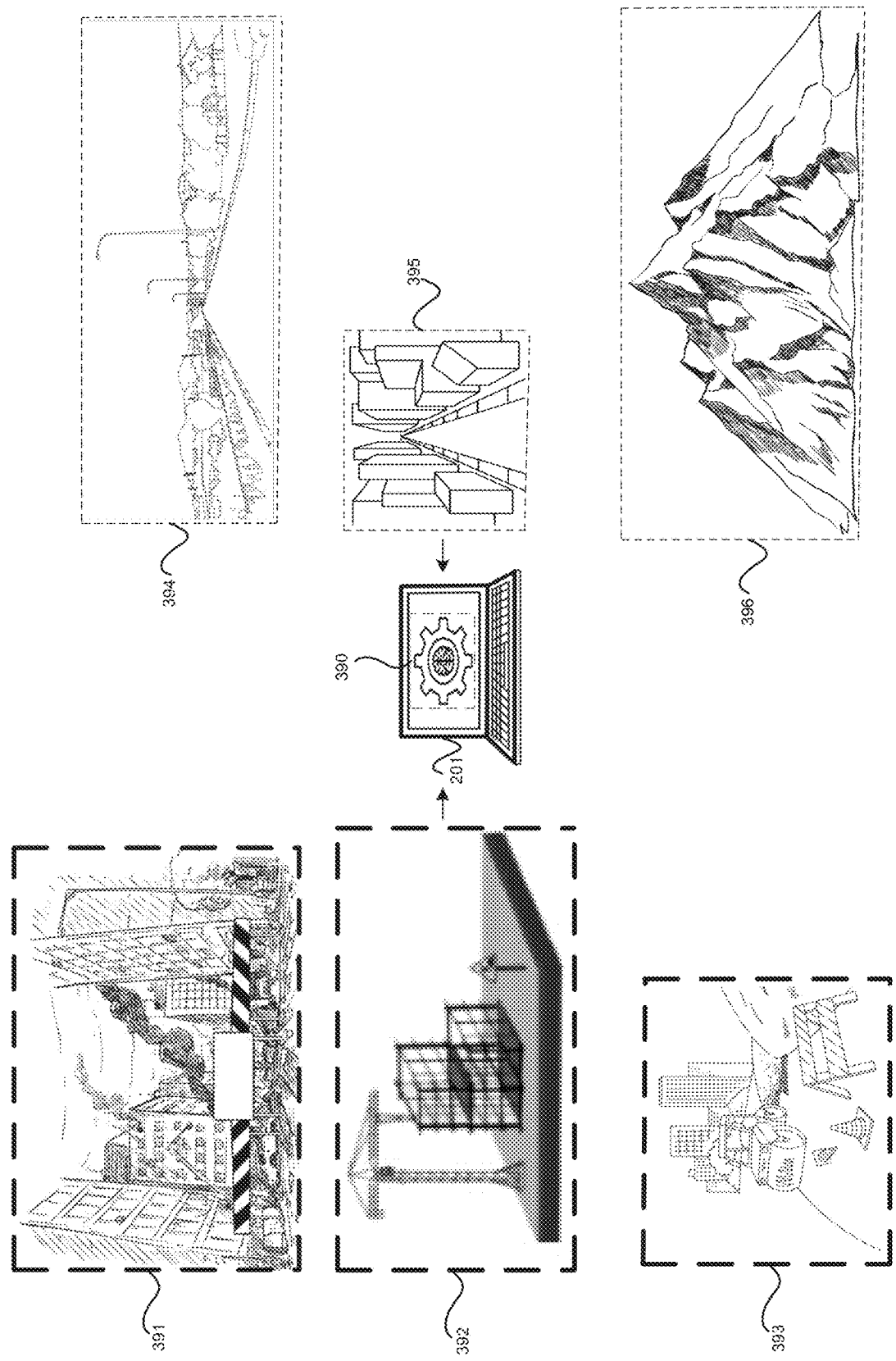

FIGS. 3A-3B illustrate an exemplary implementation of the first node 201, which performs tasks 211. As part of the tasks 211, the first node 201 determines frames of point clouds captured by the Lidar sensor 102 that are to be processed by the second node 202. In some embodiments, the first node 201 may include four CPUs and a 10 GHz memory. In some embodiments, the first node 201 may determine that if a frame of Lidar data captures a same region or field as a previously captured Lidar frame, then that frame of Lidar data does not need to be processed and/or may be discarded or removed. In some embodiments, the first node 201 may, additionally or alternatively, determine that if a frame of a point cloud has more than a threshold amount of overlap with a second frame of a point cloud in a common region, then only the frame, or only the second frame, is to be processed, rather than both the frame and the second frame being processed. In some embodiments, the first node 201 may determine that if a frame of a point cloud corresponds to a position of the vehicle 101 that has not moved, or has moved by less than a threshold distance from a previously processed frame, then the frame does not need to be processed. Thus, the first node 201 may determine that only frames corresponding to positions (e.g., captured by the vehicle 101 at positions that differ by at least a threshold distance) are to be processed. The first node 201 may determine frames that are to be processed as key frames. To further clarify the determination of key frames, suppose that the Lidar sensor 102 captures frames of point clouds at a frequency of 10 Hz. Each of the frames may be represented by a time, such as a timestamp, and a trajectory, which may include a timestamp, position, location, and/or corresponding pose at that time. A timestamp may be mapped to a trajectory in a one-to-one, or bijection, mapping. A frame may be identified by the one-to-one mapping, the timestamp, and/or the trajectory. If the vehicle 101 fails to move, or moves slowly, during or between the capture of the frames, then different frames of point clouds may not actually capture new data compared to previous frames, and different frames of point clouds may capture common data or features. If a frame captures the same data or features as was captured in previous frames, that frame does not need to be processed. In the example illustrated in FIG. 3A, the first node 201 may determine frames 312 and 314 as key frames, while determining that a frame 313 is not a key frame because the frame 313 contains common data as the frame 312, without including additional details that were not included in other frames such as the frames 312 and 314. However, the frame 314 is determined to be a key frame because the frame 314 contains additional features such as a building that was not in either of the frames 312 and 313. The first node 201 may transmit frames that are determined as key frames to the second node 202, or particular subnodes of the second node 202 assigned to process the frames.

Other criteria may be used by the first node 201 to determine whether a frame is a key frame. In some embodiments, the first node 201 may further determine whether or not a particular frame of point cloud data is to be processed based on features present in the particular frame. For example, if a particular frame is determined to have specific classifications or types of one or more features, and/or particular contexts of the one or more features, then that particular frame may be determined as a key frame even if the one or more features are present in previously processed frames. As some examples, such features may be determined as key features and may include roads, traffic signs, landmarks, detours, construction sites, road closures, or unexpected barriers, obstacles, or disturbances on a road such as rocks or branches, which would be especially important for navigation purposes. Additionally, as some examples, a presence of a combination of features and contexts being present in a frame may result in the frame being determined to be a key frame. For example, a tree trunk or rock by itself may not be a key feature, but a frame having a tree trunk or rock being present on a surface of a road may be determined as a key frame. If so, the first node 201 may determine that one or more additional frames that capture such features and/or contexts are to be processed to obtain additional detail and/or perspectives of such features, which otherwise would not be processed. In other examples, if the one or more features present in previously processed frames have a resolution or clarity below a threshold level, the first node 201 may determine that additional frames having the one or more features may need to be processed to obtain additional resolution or clarity. In other examples, if the features and/or contexts were previously shown from different perspectives and/or poses, the first node 201 may determine that additional frames having the features and/or contexts shown from different perspectives and/or poses in order to capture and/or analyze multiple perspectives and/or poses of a same feature or context.

As shown in FIG. 3B, the first node 201 may include one or more machine learning models 390 that determine, infer or estimate boundaries of features within frames and whether any of the features within the frames constitute key features. Additionally, the machine learning models 390 may further infer contexts surrounding features within key frames, and whether a context would result in a frame being determined to be a key frame. Such machine learning models may include a Hidden Markov Model (HMM), radial basis function (RB F) network, a recurrent neural network (RNN), or a deep neural network (DNN). As illustrated in FIG. 3B, the machine learning models 390 may be trained using training datasets including, for example, training datasets 391, 392, and 393, which include examples of key features such as road obstructions, construction sites, and road constructions, respectively, which would result in a frame being determined to be a key frame. The machine learning models 390 may also be trained using training datasets 394, 395, and 396, which include a road, buildings, and scenery, which by themselves, would not result in a frame being determined to be a key frame. Therefore, the machine learning models 390 may be trained to determine which features and/or contexts, or combinations thereof, result in a frame being determined or not determined as a key frame, and are to be processed by the second node 202. If the frame is determined as a key frame, even if the features in that frame were present in a previously processed frame, and/or if that frame would otherwise not be processed, then that frame would be still be processed because that frame may provide additional detail to aid or assist in navigation of the vehicle 101 or another vehicle.

Figure 4:
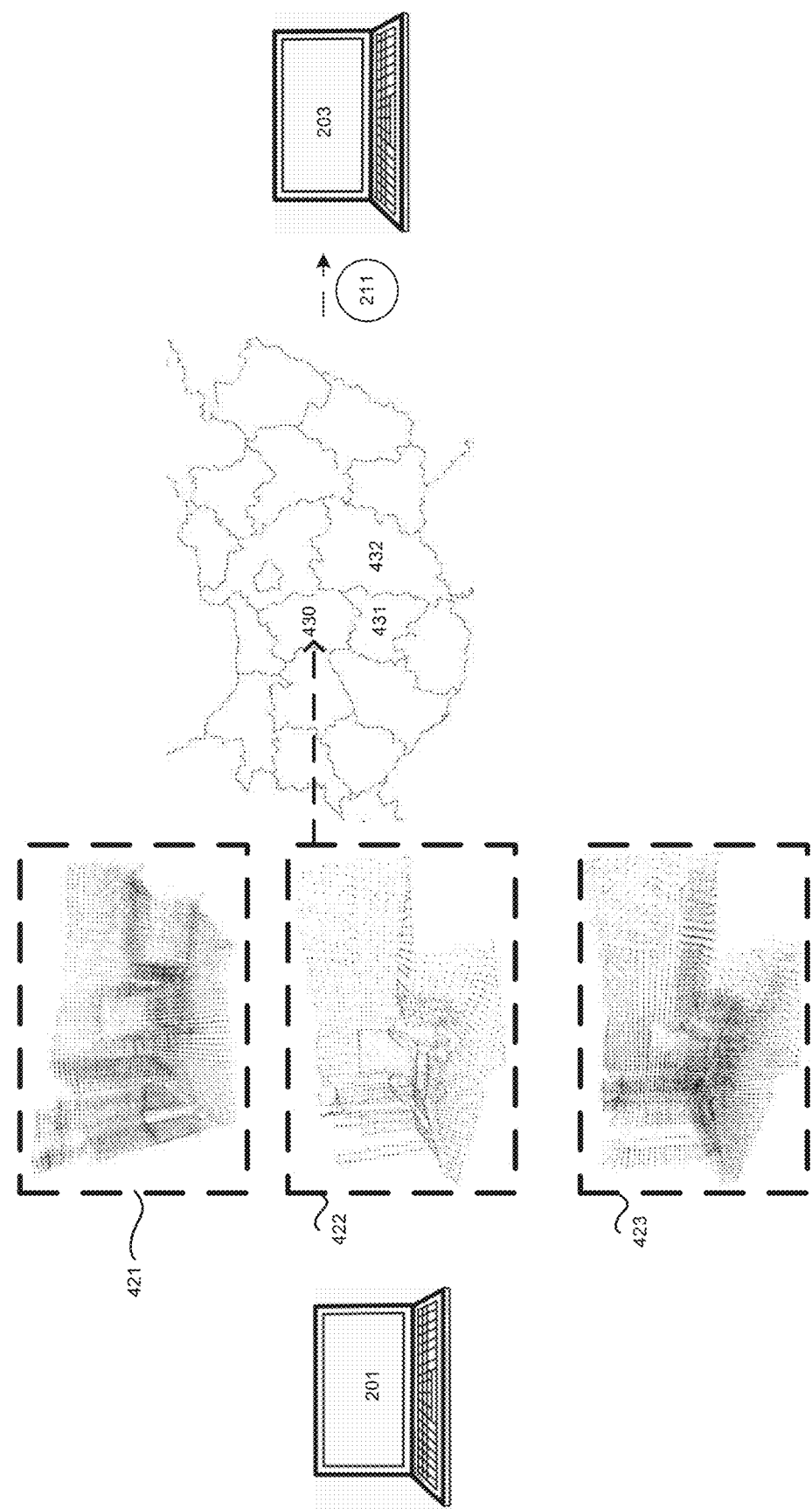

As part of the tasks 211, the first node 201 may also determine a scheduling and/or allocation of processing, computation, and/or analysis jobs to be performed by each of the subnodes 203, 204, and 205. The jobs may refer to particular frames of point clouds to be processed or analyzed by each of the subnodes 203, 204, and 205. The processing or analysis by each of the subnodes 203, 204, and 205 may include determining constraints such as loop closure constraints and/or odometry constraints of the frames of the point clouds. For example, the first node 201 may allocate frames of point clouds to each of the subnodes 203, 204, and 205 based on locations or timestamps corresponding to the frames of the point clouds. The subnode 203 may be assigned to process frames of point clouds captured within one or more specific locations, regions, areas, tiles, or segments. As shown in FIG. 4, the first node 201 may allocate the frames 421, 422, and 423, which all belong within a common region 430, to the subnode 203. Similarly, the first node 201 may allocate frames belonging to common locations, regions, or areas to each of the other subnodes such as the subnodes 204 and 205. For example, the first node 201 may allocate, to the subnodes 205 and 206, frames of point clouds belonging to a region 231 and to a region 232, respectively. In such a manner, each of the subnodes 203, 204, and 205 may process frames of point clouds in only a particular locations, regions, areas, tiles, or segments, and/or as indicated by a particular range of timestamps. Each of the subnodes 203, 204, and 205 may receive frames identified by a bijection mapping of times to trajectories.

The first node 201 may further allocate jobs to each of the subnodes 203, 204, and 205 based on specifications or parameters of each of the subnodes 203, 204, and 205, map areas covered by each of the segments, and/or an estimated computational processing power required within each of the segments, which may be determined in part by a number of key frames within each of the segments and a proportion of the key frames that have potentially unreliable corresponding position and/or attitude estimates. Additionally, if data from a segment has already been previously cached on one of the subnodes 203, 204, or 205, the first node 201 may assign another task from that area to that subnode.

Figure 5:
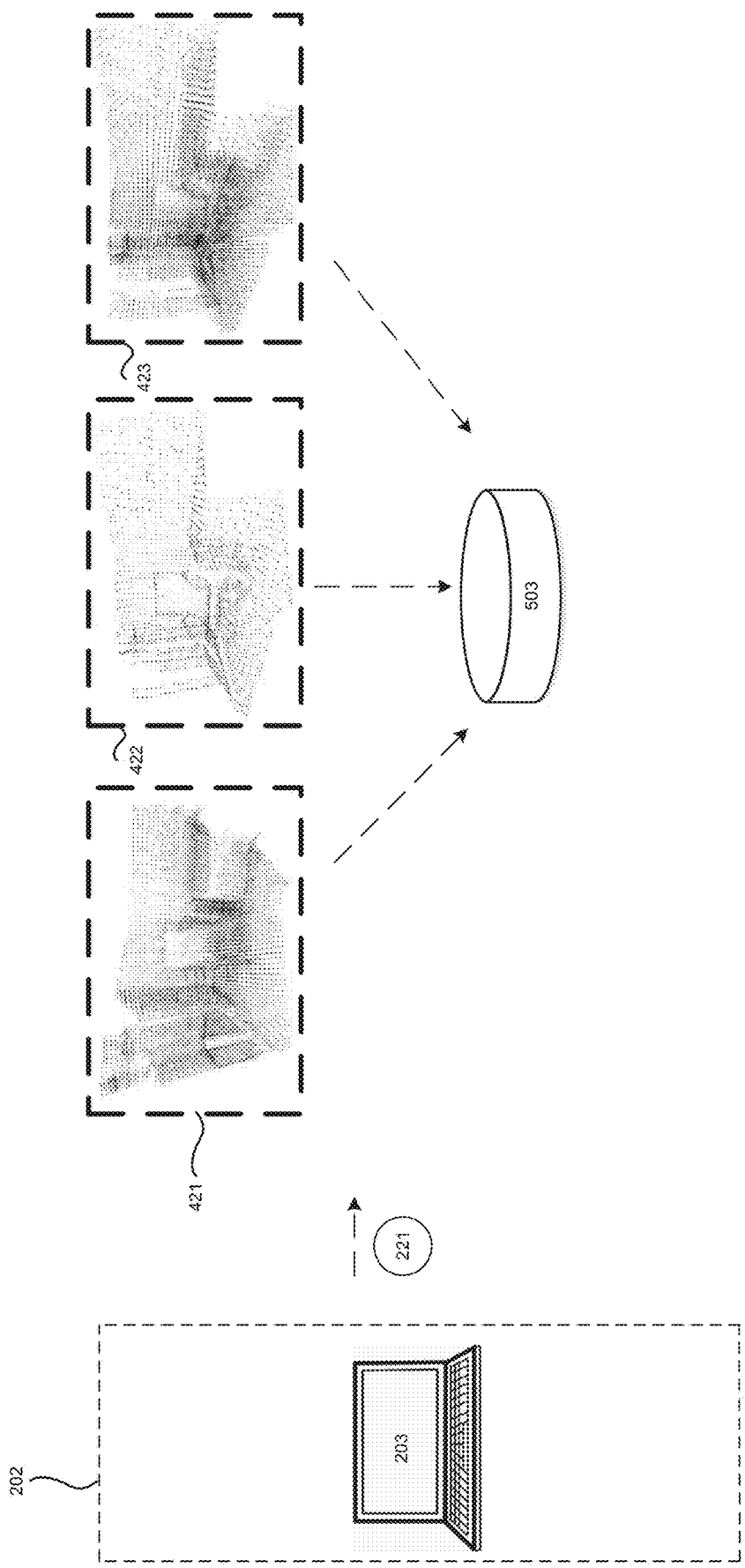
FIGS. 5-9 illustrate an implementation of a second component, a second processing node or second node, of the distributed computing platform shown in accordance with FIGS. 1A-1B and 2.

FIGS. 5-9 illustrate an exemplary implementation of the second node 202, which includes the subnodes 203, 204, and 205, in performing the tasks 221. In FIGS. 5-9, only the subnode 203 is shown without the subnodes 204 and 205 for simplicity and merely illustrative purposes, although it is understood that the subnodes 204 and 205 perform functions equivalent or analogous to the subnode 203, on frames that correspond to their respective assigned segments. As illustrated in FIG. 5, the subnode 203 may selectively cache the frames 421, 422, and 423 of point clouds assigned to the subnode 203 in a cache 503, which may be specific to the subnode 203. Each of the subnodes 203, 204, and 205 may have their own respective caches. In some embodiments, if the subnode 203 receives other frames of point clouds that it is not assigned to process, then the subnode 203 may not cache those other frames. Such a scenario may arise, for example, if the first node 201 transmits all frames to each of the subnodes 203, 204, and 205, but instructs each of the subnodes 203, 204, and 205 to process only particular frames corresponding to a specific segment, region, or range of timestamps. Once the subnode 203 caches the frames 421, 422, and 423, the subnode 203 may process or analyze those frames.

Figure 6:
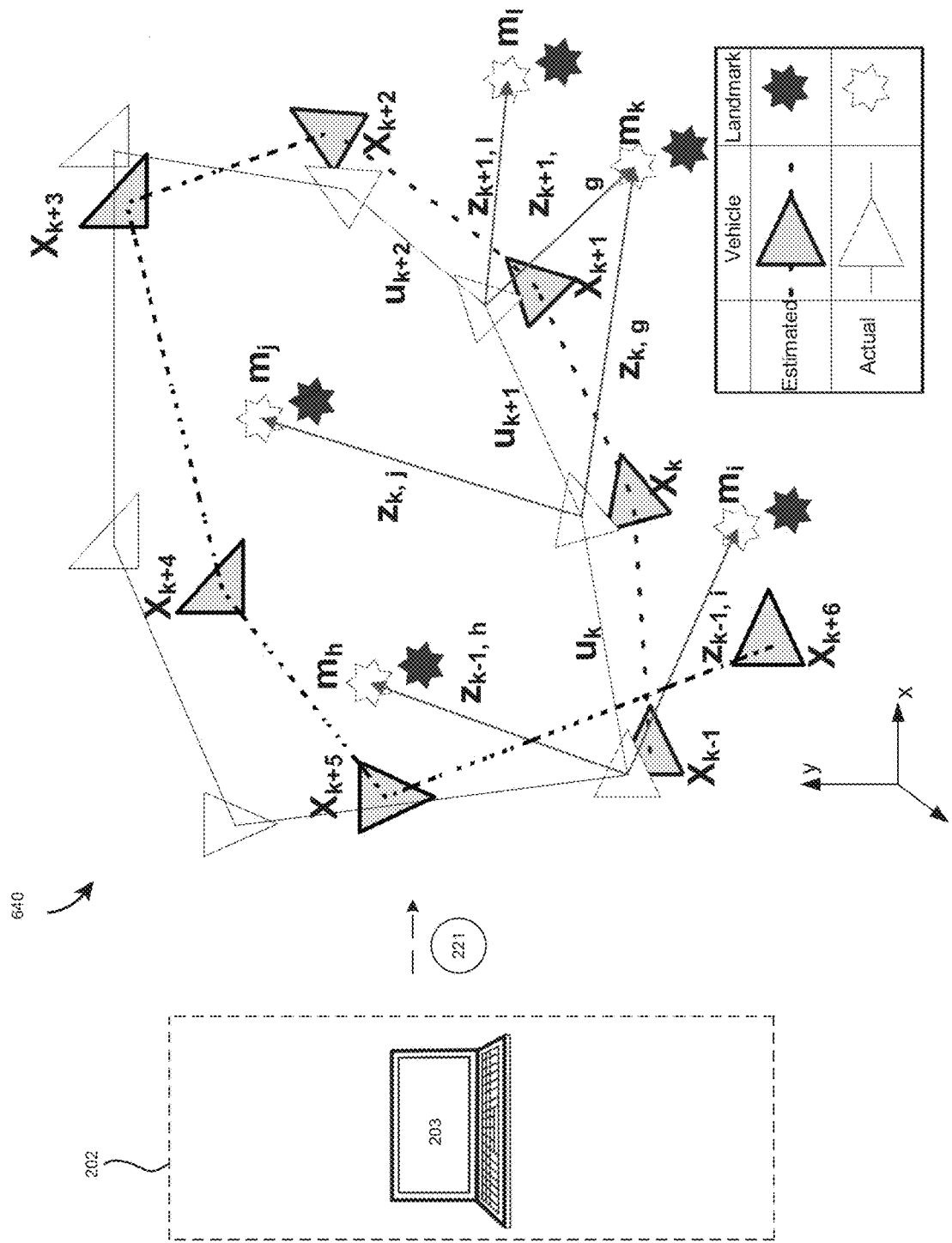

FIG. 6 illustrates an implementation of the second node 202, which may determine constraints such as loop closure constraints and/or odometry constraints on a subset (e.g., all or a portion) of frames received from the first node 201. Each of the subnodes 203, 204, and 205 may register, as pairs, a subset of frames of the point clouds based on respective surface normals of each of the point clouds. The registration process may align a pair of point clouds. Each of the subnodes 203, 204, and 205 may then determine loop closure constraints based on the registered subset of point clouds. An exemplary implementation of how the subnode 203 determines constraints is described below. Principles illustrated below, although described with respect to the subnode 203, are applicable to the other subnodes, such as the subnodes 204 and 205.

In FIG. 6, the subnode 203 may generate constraints such as loop closure constraints and/or odometry constraints based on landmarks captured at particular times by the vehicle 101. An exemplary representative environment 640 illustrates how loop closure constraints and/or odometry constraints may be generated. In the environment 640, particular positions and attitudes of the vehicle 101 may be indicated by points $X_{k-1}$; $X_k$; $X_{k+1}$; and $X_{k+2}$. Landmark locations may be represented by $m_h$; $m_i$; $m_j$; $m_g$; and $m_l$. The points $X_{k-1}$; $X_k$; $X_{k+1}$; and $X_{k+2}$, may indicate state vectors describing positions and attitudes of the vehicle 101 at times k−1, k, k+1, and k+2, respectively. The landmarks may be captured from Lidar point clouds such as the point clouds 132 and/or 133, and locations of the landmarks may be used to derive positions and attitudes of the Lidar point clouds. $u_k$; $u_{k+1}$; and $u_{k+2}$ may indicate controls and/or odometry readings of the vehicle 101 as the vehicle 101 travels between two points. $u_k$ is between the two points $X_{k-1}$ and $X_k$, $u_{k+1}$ is between the two points $X_k$ and $X_{k+1}$, and $u_{k+2}$ is between the two points $X_{k+1}$ and $X_{k+2}$. $z_{k-1, i}$; $z_{k-1, h}$; $z_{k-1, g}$; $z_{k, j}$; $z_{k+1, g}$; and $z_{k-1, l}$ represent observations taken of distinct times and landmarks. For instance, $z_{k-1, i}$ indicates an observation taken at a time k−1 of the landmark $m_i$. The subnode 203 may associate additional points of the vehicle 101 with captured sensor data such as Lidar point clouds. The additional points may be synchronized or correlated in time with captured Lidar point clouds, so that at each of the additional points, Lidar point clouds captured at a time corresponding to a time of the additional points are associated. Because a distance between a position of the vehicle 101 and an associated Lidar point cloud is known, the subnode 203 may determine a position and an attitude of the associated Lidar point cloud from the known position and the attitude of the vehicle 101. If multiple point clouds were captured at a same time, the subnode 203 may perform a point cloud registration to combine these point clouds. The point cloud registration will be described in additional detail below with respect to FIG. 7, and may include a rotation and a translation to align one point cloud, a target point cloud, to another point cloud, a source point cloud. In some embodiments, the subnode 203 may determine additional constraints. The additional constraints may define restrictions of each of the points, between two points, and between points and landmarks. The additional constraints may continuously update estimations of positions and attitudes of the vehicle 101, so that initial estimations of positions and attitudes of the vehicle 101 and positions of the landmarks may be updated and eventually converge near actual positions and attitudes of the vehicle 101 and actual positions of the landmarks.

Furthermore, in some embodiments, the subnode 203 may determine additional loop closure constraints based on proximities between positions at two different times, or proximities between different positions having time proximities. The subnode may use odometry data such as the odometry data 130 and 131, to determine the additional loop closure constraints. For example, based on the odometry data 130 and 131, the subnode 203 may infer or estimate that the vehicle 101 is returning to a location within a threshold distance of a previously traversed location, and having an attitude similar to that when the vehicle 101 previously traversed the location. The location and attitude may be defined by x and y planar coordinates while disregarding z (elevational) coordinates. The additional loop closure constraints may require that the vehicle 101 returns to a previous location at a same or similar orientation as the previous orientation, such that the orientations do not differ by more than a threshold. For example, the subnode 203 may infer or estimate that at the point $X_{k+6}$, corresponding to a time k+6, a position and an attitude of the vehicle 101 are within thresholds of the position and the attitude of the vehicle 101 at the point $X_{k-1}$ corresponding to the time k−1. The subnode 203 may validate or confirm that the points $X_{k+6}$ and $X_{k-1}$ do indeed correspond to loop closures, for example, by determining whether common features exist at the point clouds captured at the points $X_{k+6}$ and $X_{k-1}$. One exemplary method involves converting and representing point clouds captured at the points $X_{k+6}$ and $X_{k-1}$ into a vector using, for example, a deconvolution network, encoding and decoding steps, and applying a model such as a bag-of-words model to recognize any common features. The detection of loop closures increases an accuracy of the pose graph by reducing a drift error that would otherwise occur over time, and incorporating an additional constraint corresponding to the loop closure. Thus, an estimated position and the attitude represented by the point $X_{k+6}$ may be updated, along with positions and attitudes represented by previous points. An estimated position and attitude of the point clouds associated with each of the points may also be updated.

Figure 7:
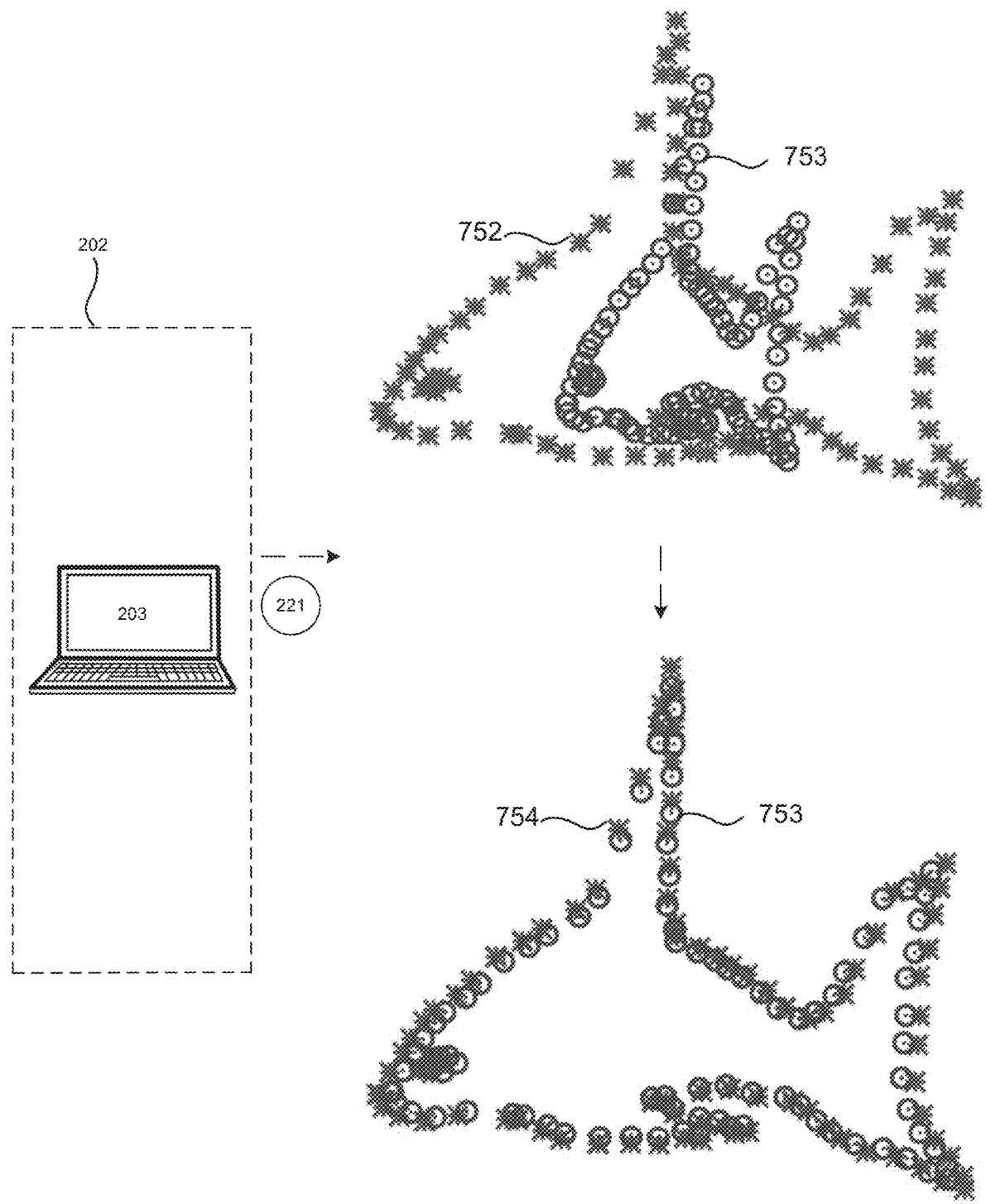

In some embodiments, upon the subnode 203 inferring or estimating a potential loop closure, the subnode 203 may attempt to perform a point cloud registration on the point clouds captured at times corresponding to the potential loop closure (e.g., the point clouds captured at the times k+6 and k−1 in FIG. 6). The subnode 203 may also attempt to perform point cloud registration on point clouds having time proximities, meaning that the point clouds were captured at similar times within a threshold duration of each other. If, following the attempted point cloud registration, the resulting registered point clouds do not sufficiently align, then the individual point clouds may be kept separate without registration. An illustration of the point cloud registration process is shown in FIG. 7, in which point clouds 752 and 753 that are initially unaligned and have different origins are registered by a rigid transformation of the point cloud 752. The rigid transformation may include a translation and rotation of the point cloud 752 to align with the point cloud 753 as closely as possible. Here, the point cloud 753 may be a source, or an earlier point cloud, and the point cloud 752 may be a target, or a later point cloud that is transformed to be aligned with the point cloud 753. Following a transformation of the point cloud 752, a transformed point cloud 754 may be aligned with the point cloud 753. Outliers and background data from one or both of the point clouds 753 and 754 may be detected and filtered following an initial transformation, and following removal of outliers and background data, the registration process may be repeated to refine a previous alignment.

Figure 8:
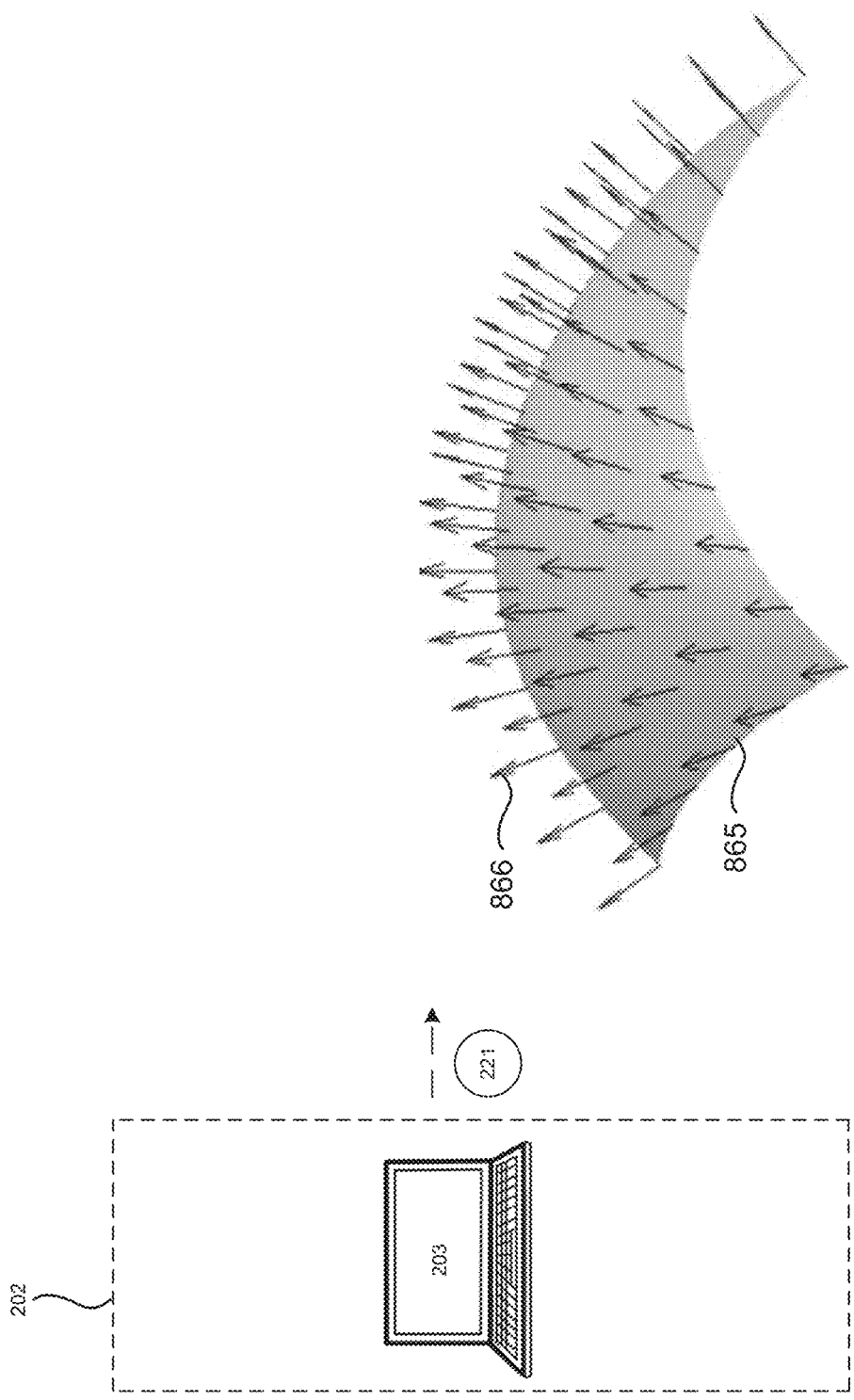
Figure 9:
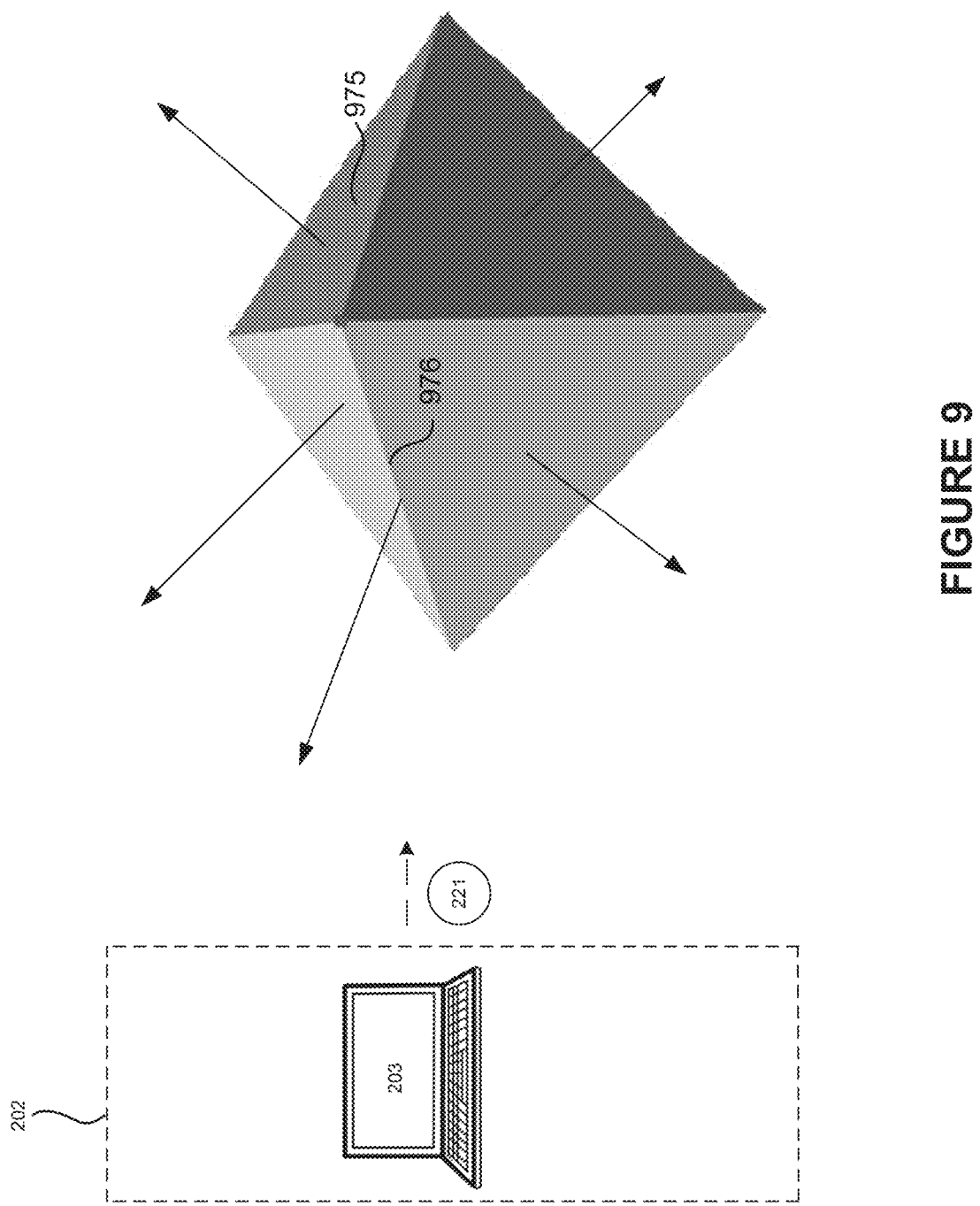
Figure 10:
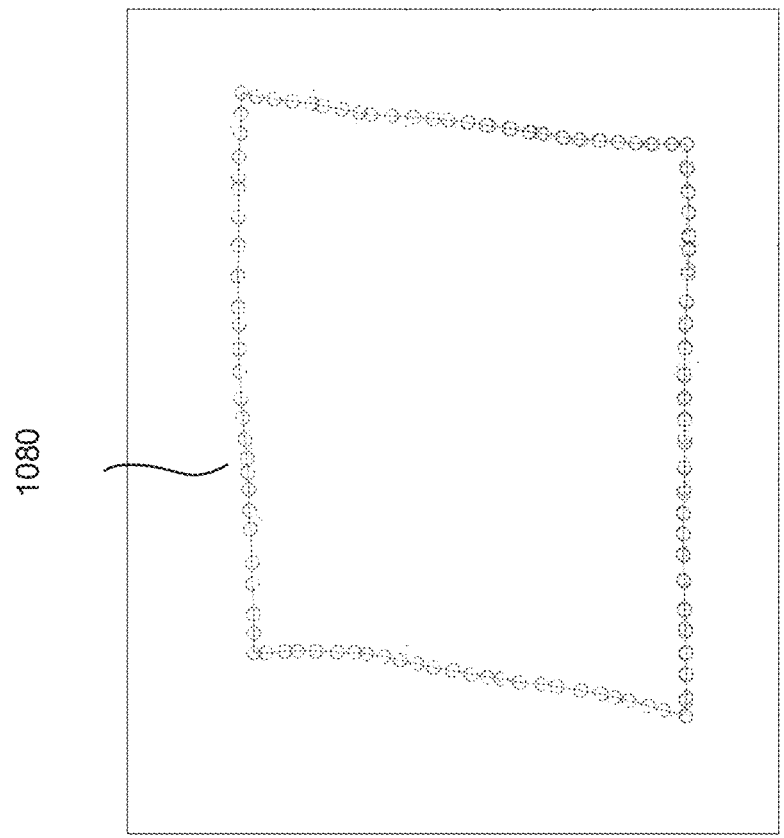
FIG. 10 illustrates an implementation of a third component, a third processing node or third node, of the distributed computing platform shown in accordance with FIGS. 1A-1B and 2.
Figure 10:
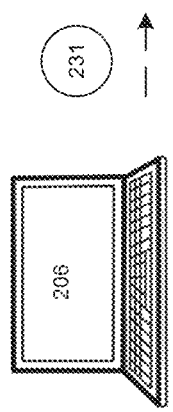

The point cloud registration process, as carried out, for example, by the subnode 203, may maintain speed and simplicity to conserve processing resources while also accounting for outliers, measurement noise, and other probabilistic techniques to enhance robustness. The registration process may include estimating a surface normal of each point in a point cloud, as shown in FIGS. 8 and 9. Here, a normal to each point of Lidar data is considered, and a distribution of each point relative to its neighbors is considered. Here, for each point of Lidar data, a normal to an estimated surface that the point belongs to may be obtained. The surface may be a curved surface, such as 865, as shown in FIG. 8, or one of flat surfaces 975, as shown in FIG. 9. In FIG. 8, surface normals 866 are estimated. In some embodiments, as shown in FIG. 9, a point may lie on an edge or a corner, such as an edge 976. In such a scenario, the surface normal may be determined to be a same as a surface normal of a nearest neighboring point, or, an average, such as a weighted average, between surface normals of two nearest neighboring points. Estimating a surface normal of each point may improve a rate of convergence to a solution. Preliminary steps of the point cloud registration process further include determining or estimating a range accuracy of each point based on a distance from the point to a Lidar sensor (e.g., the Lidar sensor 102), a relative difference between the surface normal and an orientation of the Lidar, a previous estimation of the surface, and an intensity of the surface. A category of the entire point cloud may be determined based on a degree to which the point cloud is self-repetitive, which may indicate a frequency or degree to which features in the point cloud repeat. In some embodiments, the categories may include, a flat surface, a pole, or not falling under any specific feature (e.g., uncategorized). The categories may include, ground, road surface, high vegetation, a building, and a human made object. As another example, categories may include bare earth, ground, top of canopy, and water. The categories may define a type of object or entity that has reflected a laser pulse from the Lidar sensor. If the point cloud has a high degree of self-repetitiveness such as, in tunnels, where the obtained point clouds are similar regardless of a location of point cloud capture, parameters that regulate the determination of a potential loop closure candidate may be tightened, compared to corresponding parameters in regions of lower self-repetitiveness, to reduce a possibility of mistaken determinations of loop closures. Certain potentially detected loop closures may be discarded. Next, a category of each point in the point cloud may be classified, based on a surface normal and an associated singular value of the surface normal. In particular, for each point in the point cloud, geometric neighbors of the point are obtained. A covariance matrix may be determined based on these neighbor points and the point. An eigen decomposition (EVD) of the point may be determined. This process is known as principal component analysis (PCA). The eigen decomposition will yield eigenvalues, which is synonymous with the singular value obtained from singular value decomposition (SVD) because of the symmetric nature of the covariance matrix. However, performing an EVD may be less computationally expensive. Based on features of the eigenvalues, for example, relative values of the eigenvalues, the point may be classified as a flat surface, a pole, or not belonging to a specific category.

The point cloud registration process includes an iterative process that is repeated until convergence. For each point from a source point cloud, obtained at an earlier time, a corresponding closest point in a target point cloud, obtained at a later time, may be selected using a GPU. The point from the source point cloud and the closest point are required to have a same category, or else, that pair is discarded and another point from the source point cloud and a closest point in the target point cloud are selected. For a point from the source point cloud and a corresponding closest point in the target point cloud having matching categories, a mahalanobis distance may be determined between the two points based on the surface normal of the source point cloud. Cost functions may be determined based on the determined mahalanobis distance and based on the determined or estimated range accuracy of the point from the source point cloud and/or the target point cloud. A solution to minimize the cost functions may be obtained by adjusting position and attitude parameters of the source point cloud relative to an origin. In some examples, the origin may be a rear-axis of the vehicle, and an attitude is defined to be a same as an attitude of the vehicle. The origin and the axes, however, can be defined in other manners, such as an origin of the Lidar sensor, or an origin of a navigation-box of the vehicle. Defining different origins will yield different coordinates of the source point cloud. The iterative process converges when an amount of adjustment or change in the position and the attitude parameters between successive iterations differs by less than a threshold.

Based on the registered point clouds, the subnode 203 may additionally detect and/or infer potential loop closures. For example, if two point clouds from different times have been successfully registered, the subnode 203 may infer that a potential loop closure has occurred corresponding to these two different times because similar or same features were observed from the two point clouds. The subnode 203 may then validate or confirm that a loop closure has occurred. If the loop closure has been confirmed or validated, the subnode may then add a loop closure constraint between two nodes corresponding to the different times. For example, the loop closure constraint may require that the vehicle 101 be at or near a same location, within a threshold distance, at the times associated with the loop closures.

For each of the loop closure, odometry, and other constraints, the subnode 203 may determine a corresponding cost function. Parameters associated with a position and an attitude of associated point clouds such that the cost function is optimized and convergent may be determined. When a cost function is optimized, the corresponding constraint may be satisfied. Next, further refinement to the parameters may be carried out. For example, if a constraint cannot be satisfied or minimized, the subnode may remove such a constraint based on a self-adaption threshold of an actual cost, iterations of repetition, and differences in Euclidean distance. Furthermore, loop closure constraints may be added in regions of which a degree of self-repetition (a frequency or number of repeated features) is greater than a threshold, while avoiding points that have been previously removed. In particular, a previous process of tightening the parameters in self-repetitive regions may cause points to become detached from the pose graph and misalignment among points. For those detached or misaligned points, the subnode 203 may attempt to add constraints. The constraints may be from loop closure constraints. The parameters may be further refined based on the newly removed and added constraints. Constraints may continue to be removed until a number of constraints that cannot be minimized is smaller than a threshold. The constraints from the subnodes 203, 204, and 205, as determined during the tasks 221, may be transmitted to the third node 206. Further details regarding point cloud registration are described in application Ser. No. 17/124,444, filed on Dec. 16, 2020, which is hereby incorporated by reference in its entirety.

Figure 11:
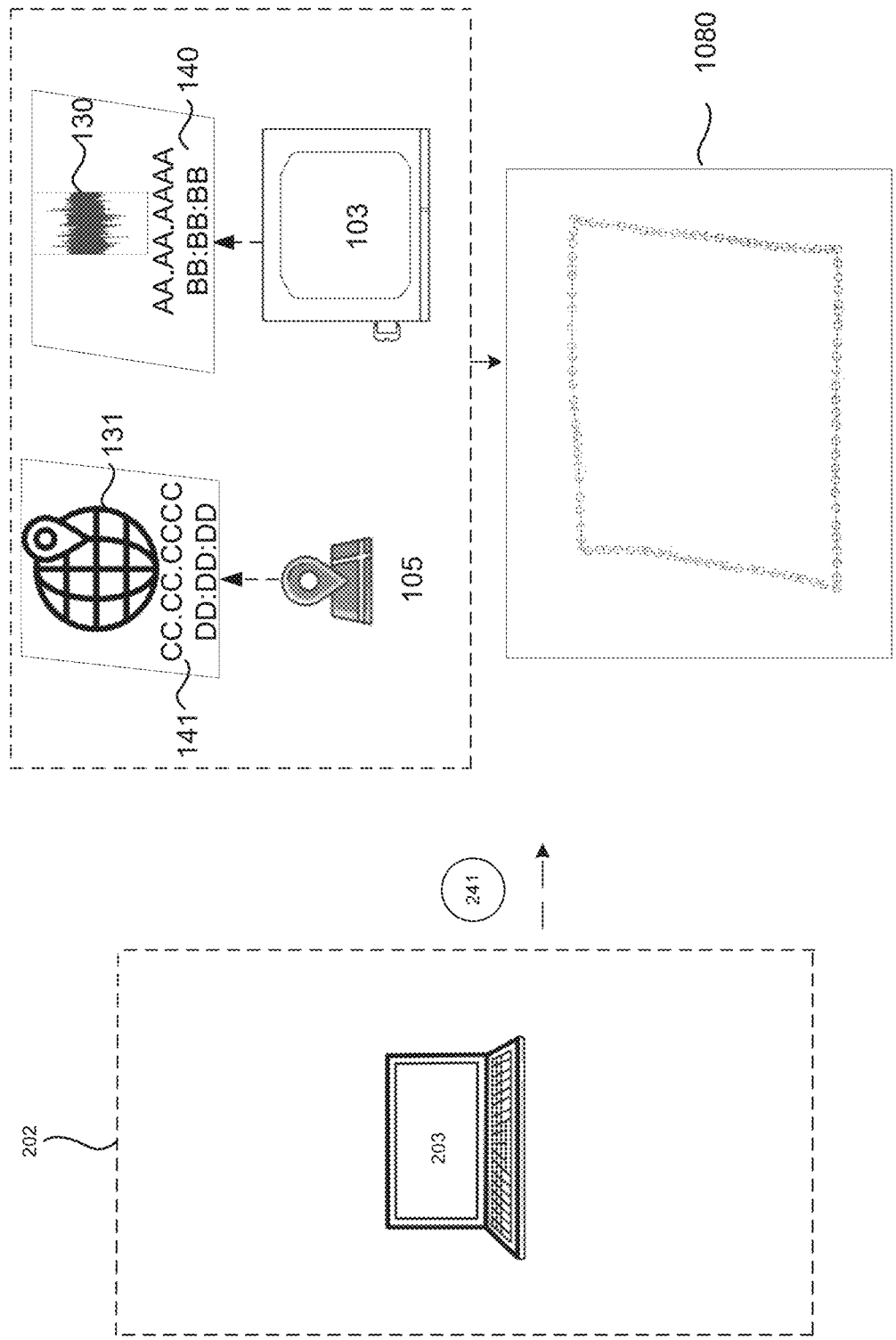
FIGS. 11-12 illustrate an implementation of the second component, the second processing node or the second node, of the distributed computing platform shown in accordance with FIGS. 1A-1B and 2.

As illustrated in FIG. 11, the third node 206 may perform the tasks 231, which may include aggregating the outputs from the subnodes 203, 204, and 205, and aligning frames of point clouds processed by the subnodes 203, 204, and 205. For example, the third node 206 may align frames of point clouds at boundaries of the segments 230 and 231, which have been processed by two different subnodes 204 and 205. The third node 206 may use the constraints and the aligned frames to determine an optimal SLAM solution. The optimal SLAM solution may include most likely poses, including position and/or attitude, of the vehicle 101 at different times when the point clouds and/or landmarks were captured, as represented by a pose graph 1080 of FIG. 10. It is to be contemplated that other forms of the optimal SLAM solution besides the pose graph 1080 may be generated and/or outputted by the third node 206. For example, the third node 206 may alternatively generate .traj files that contain data of the determined optimal SLAM solution.

The third node 206 may transmit corresponding portions of optimal SLAM solution points back to the subnodes 203, 204, and 205. The corresponding portions of optimal SLAM solution points may be transmitted back to the subnodes 203, 204, and 205 based on which segments were originally assigned to each of the subnodes 203, 204, and 205 in the tasks 211. For example, a portion of SLAM solution points corresponding to the segment 230 may be transmitted to the subnode 203.

Once each of the subnodes 203, 204, and 205 receives a corresponding portion of optimal SLAM solution points, each of the subnodes 203, 204, and 205 may perform the tasks 241, which include conducting post processing by augmenting the SLAM solution points with corresponding car poses using odometry data such as the odometry data 130 and 131 captured by the IMU 103 and the GPS sensor 105 and having timestamps 140 and 141. The odometry data 130 and 131 may be specific to and correspond to a particular segment of a map assigned to each of the subnodes 203, 204, and 205. For example, the subnode 203 may not need to process odometry data outside of the particular segment or segments assigned to the subnode 203.

Figure 12:
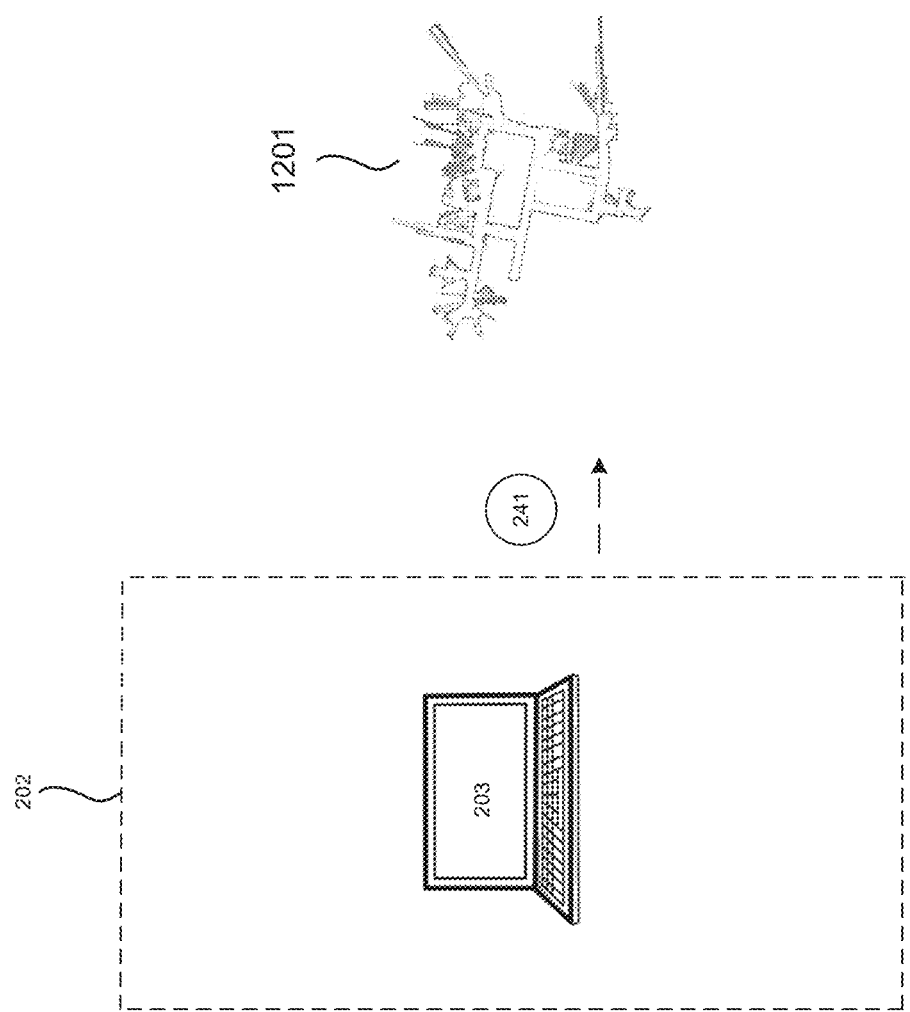

The odometry data 130 and 131 generated from the IMU 103 and GPS sensor 105, respectively, having the respective timestamps 140 and 141, may be fused or synchronized by the subnodes 203, 204, and 205, via GNSS/INS post processing, as shown in FIG. 11. For example, IMU and GPS data captured at same times may be fused to obtain an estimate of a position and attitude (e.g., orientation) of the vehicle 101, as well as a covariance matrix indicating a confidence level or accuracy of each estimation. In some embodiments, the odometry data 130 and 131 may provide a sanity check on, and/or further refine, the obtained position and attitude of the vehicle 101, from the SLAM optimization data determined by the third node 206. Thus, the subnodes 203, 204, and 205 may further augment the SLAM optimized solution points with the odometry data 130 and 131. The subnodes 203, 204, and 205 may then transmit the augmented SLAM optimized solution points back to the third node 206, which aggregates the transmitted augmented data from the subnodes 203, 204, and 205 during the tasks 251. In other embodiments, the aforementioned steps of post processing may be performed during the tasks 221 instead of the tasks 241. In some embodiments, the tasks 241 may include each of the subnodes 203, 204, and 205 creating a partial static map, such as a partial static map 1201 as shown in FIG. 12 created by the subnode 203. The other subnodes 204 and 205 may create partial static maps corresponding to the segments and/or range of timestamps allocated to the subnodes 204 and 205.

Figure 13:
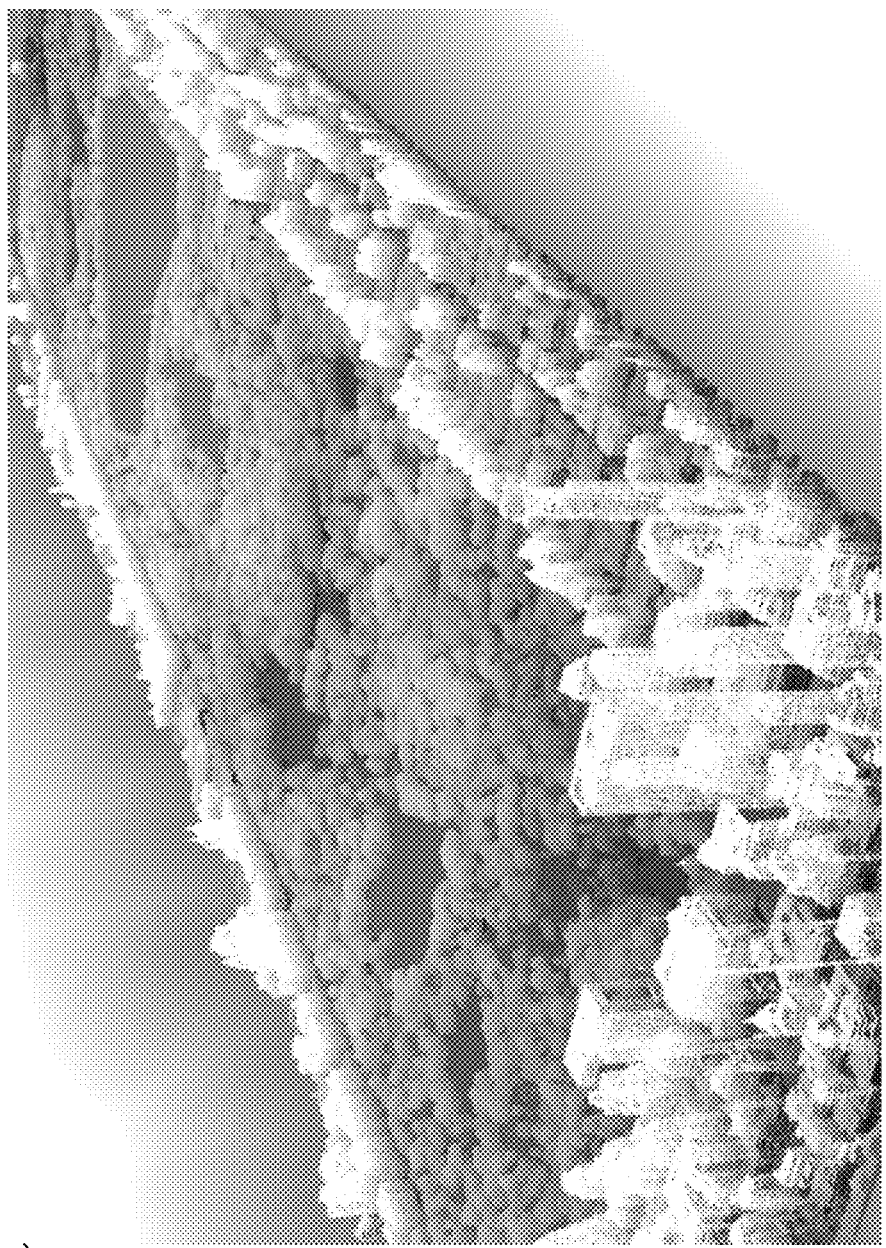
FIG. 13 illustrates an implementation of the third component, the third processing node or the third node, of the distributed computing platform shown in accordance with FIGS. 1A-1B and 2.
Figure 13:
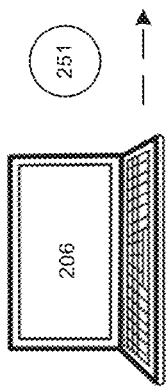

As shown in FIG. 13, the third node 206 may, during the tasks 251, generate a map 1301 or another form of a computational result from SLAM, that includes data integrated from each of the subnodes 203, 204, and 205. For example, the third node 206 may generate the map 1301 by aggregating the partial maps generated by the subnodes 203, 204, and 205.

Figure 14:
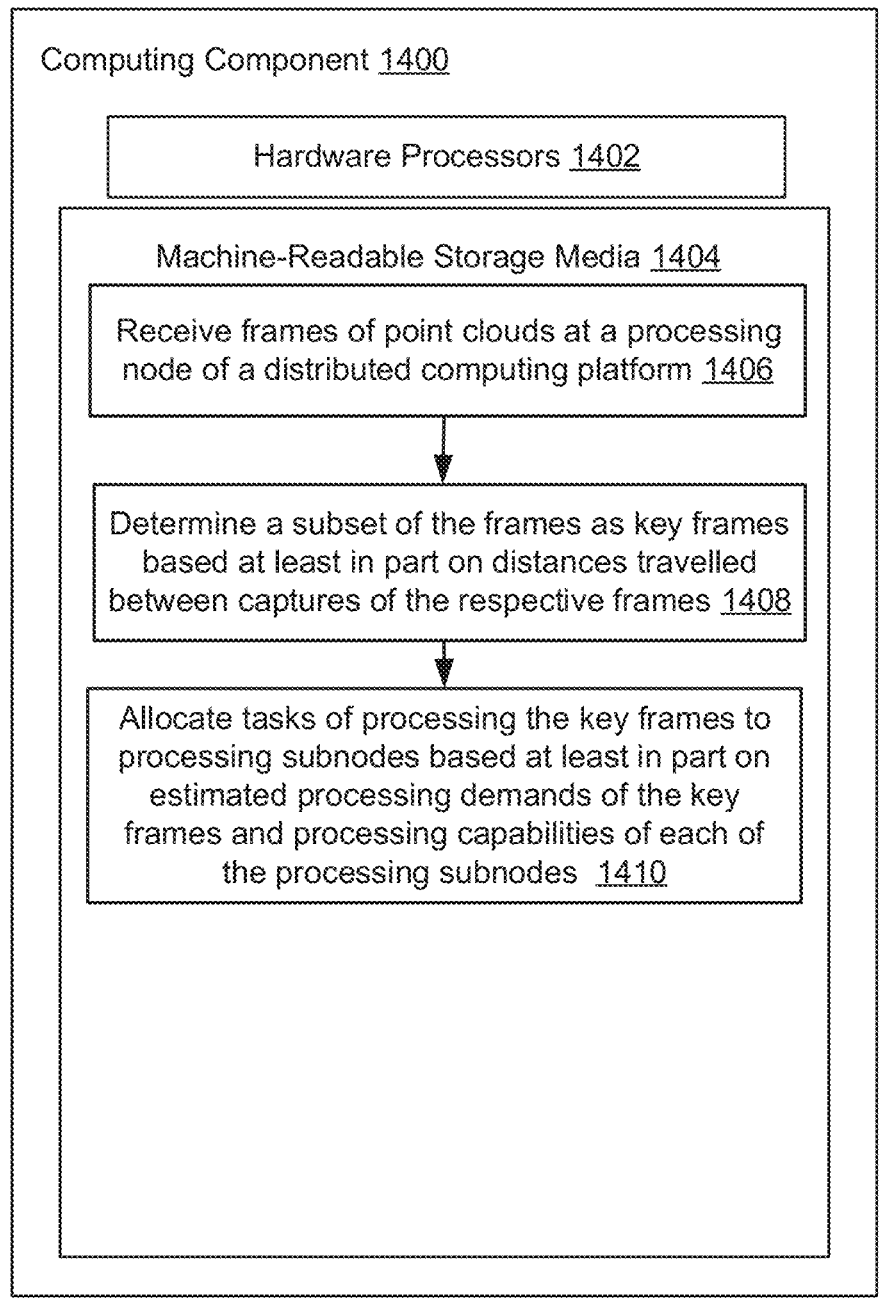
FIG. 14 illustrates a flowchart of a method of the first component, in accordance with an example embodiment of the present disclosure and as shown in accordance with FIGS. 1A-1B and 2-4.

FIG. 14 illustrates a flowchart of a computing method, according to an example embodiment of the present disclosure. The description from other figures may also be applicable to FIG. 14. The steps in FIG. 14 may be implemented by a computing component 1400, which may be implemented as the first node 201 (e.g., a processing node). The computing component 1400 may include hardware processors 1402 and machine-readable storage media 1404 which include instructions that cause the hardware processors 1402 to execute the methods in steps 1406-1410.

In step 1406, the processing node (e.g., the first node 201) of a distributed computing platform (e.g., the distributed computing platform 122) may receive frames of point clouds, for example, from a vehicle such as the vehicle 101. In step 1408, the processing node may determine a subset of the frames as key frames based at least in part on distances travelled between captures of the respective frames. In step 1410, the processing node may allocate tasks of processing the key frames to processing subnodes (e.g., the subnodes 203, 204, and 205 of the second node 202) based at least in part on estimated processing demands of the key frames and processing capabilities of each of the processing subnodes.

The techniques described herein, for example, are implemented by one or more special-purpose computing devices. For example, each of the first node 201, the second node 202, the subnodes 203-205, and the third node 206 may be implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 15:
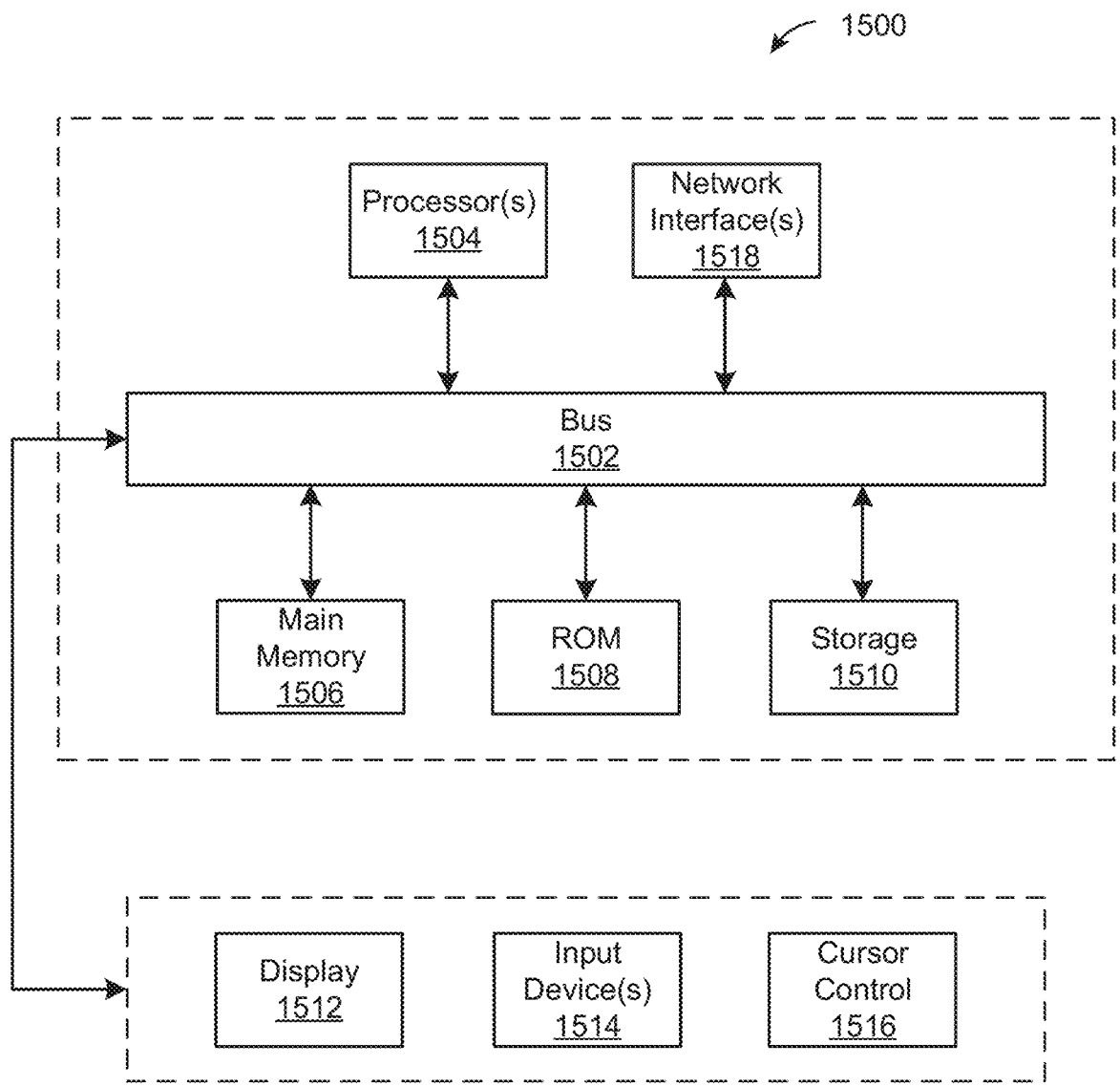
FIG. 15 illustrates a block diagram of a computer system upon which any of the embodiments described herein may be implemented.

FIG. 15 illustrates a block diagram of a computer system 1500 upon which any of the embodiments described herein may be implemented, for example, in the first node 201, the second node 202, the subnodes 203-205, and the third node 206. The computer system 1500 includes a bus 1502 or other communication mechanism for communicating information, one or more hardware processors 1504 coupled with bus 1502 for processing information. A description that a device performs a task is intended to mean that one or more of the hardware processor(s) 1504 performs that task. The hardware processor(s) 1504 may be hard-wired to perform techniques described in the Specification; they may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The hardware processor(s) 1504 may also combine custom hard-wired logic, ASICs, or FPGAs with custom programming to accomplish the techniques. The hardware processor(s) 1504 can include any suitable processing unit capable of accepting data as input, processing the input data in accordance with stored computer-executable instructions, and generating output data. The hardware processor(s) 1504 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the hardware processor(s) 1504 can have any suitable microarchitecture design that includes any number of constituent components such as, for example, registers, multiplexers, arithmetic logic units, cache controllers for controlling read/write operations to cache memory, branch predictors, or the like. The microarchitecture design of the hardware processor(s) 1504 can be made capable of supporting any of a variety of instruction sets.

The computer system 1500 also includes a main memory 1506, such as a random access memory (RAM), cache and/or other dynamic storage devices, coupled to bus 1502 for storing information and instructions to be executed by processor 1504. Main memory 1506 also may be used for storing temporary variables or other intermediate information during execution of instructions to be executed by processor 1504. Such instructions, when stored in storage media accessible to processor 1504, render computer system 1500 into a special-purpose machine that is customized to perform the operations specified in the instructions.

The computer system 1500 further includes a read only memory (ROM) 1508 or other static storage device coupled to bus 1502 for storing static information and instructions for processor 1504. A storage device 1510, such as a magnetic disk, optical disk, or USB thumb drive (Flash drive), etc., is provided and coupled to bus 1502 for storing information and instructions.

The computer system 1500 may be coupled via bus 1502 to output device(s) 1512, such as a cathode ray tube (CRT) or LCD display (or touch screen), for displaying information to a computer user. Input device(s) 1514, including alphanumeric and other keys, are coupled to bus 1502 for communicating information and command selections to processor 1504. Another type of user input device is cursor control 1516. The computer system 1500 also includes a communication interface 1518 coupled to bus 1502.

The term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A computer-implemented method comprising:
receiving frames of point clouds at a processing node of a distributed computing platform;
determining, from the frames, first frames in which first distances among the first frames exceed a given threshold;
determining, as key frames, the first frames and a second subset of second frames, wherein:
each of the second frames comprise at least a common feature as present in the first frames, the common feature in the second frames being at a higher resolution compared to that in the first frames; and
allocating tasks of processing the key frames to processing subnodes based at least in part on estimated processing demands of the key frames and processing capabilities of each of the processing subnodes.

2. The computer-implemented method of claim 1, wherein the allocating of tasks comprises:
allocating key frames having a first range of timestamps to a first processing subnode; and
allocating second key frames having a second range of timestamps to a second processing subnode.

3. The computer-implemented method of claim 1, wherein the determination of the key frames comprises determining a frame to be a key frame in response determining that a position corresponding to a capture of the frame deviates from positions corresponding to captures of remaining frames by more than a threshold distance.

4. The computer-implemented method of claim 1, wherein the tasks of processing the key frames include determining loop closure constraints based on common features identified in the key frames, the loop closure constraints indicating that a pair of the key frames were captured at locations within a threshold distance of each other.

5. The computer-implemented method of claim 4, wherein, following the determination of the loop closure constraints, the loop closure constraints are transmitted to a downstream node, the downstream node aggregating the loop closure constraints and determining positions at which each of the key frames were captured based on the aggregated loop closure constraints.

6. The computer-implemented method of claim 5, wherein, the downstream node further determines locations of the common features.

7. The computer-implemented method of claim 6, wherein, following the determination of the positions at which each of the key frames were captured, the determined positions are transmitted to the processing subnodes, the processing subnodes generating partial static maps from the respective allocated keyframes based on the transmitted determined positions.

8. The computer-implemented method of claim 7, wherein the generated partial static maps are transmitted to the downstream node, the downstream node aggregating the generated partial static maps to generate an integrated static map.

9. The computer-implemented method of claim 1, wherein the determination of key frames is based on an identification of features and contexts of the features in the frames using a trained machine learning model, and training datasets used to train the machine learning model comprise:
a first dataset including features and contexts that would result in a frame being determined to be a key frame; and
a second dataset including second features and second contexts that would result in a frame being determined to be a non-key frame.

10. The computer-implemented method of claim 1, wherein the processing demands of the key frames are determined at least in part by respective degrees of reliability of position and attitude estimations obtained from the key frames.

11. The computer-implemented method of claim 1, wherein the allocating of tasks comprises:
allocating a task to a processing subnode if frames corresponding to a same segment as the task are cached in the processing subnode.

12. The computer-implemented method of claim 1, wherein the key frames exclude any frames besides the first frames, the second frames, and the third frames.

13. The computer-implemented method of claim 1, further comprising:
determining, as key frames, a third subset of third frames, wherein:
each of the third frames comprise the common feature or a different common feature as present in the first frames, the common feature or the different common feature in the third frames being from a different perspective compared to that in the first frames.

14. The computer-implemented method of claim 1, wherein the allocating of tasks of processing the key frames to processing subnodes comprises dividing the processing of the key frames among the processing subnodes based on a proportion of the key frames that have potentially unreliable position and attitude estimates.

15. The computer-implemented method of claim 1, wherein at least a subset of the processing subnodes determine one or more additional loop closure constraints based on odometry data.

16. The computer-implemented method of claim 1, wherein at least a subset of the processing subnodes:
   attempt a point cloud registration on point clouds captured at one or more times corresponding to a potential loop closure;
   determine a degree of alignment of resulting registered point clouds; and
   if the degree of alignment of any resulting registered point clouds fail to satisfy a threshold degree of alignment, keeping the point clouds separate.

17. The computer-implemented method of claim 1, wherein at least a subset of the processing subnodes:
   receive, from downstream subnodes, one or more potential poses of a vehicle at different times of capture of the point clouds; and
   augment the potential poses with odometry data generated by an inertial measurement unit (IMU) and a Global Positioning System (GPS) sensor.

18. An apparatus comprising:
   a processing node of a distributed computing platform, the processing node being one of a plurality of processing nodes and being configured to communicate with other ones of the plurality of processing nodes over one or more networks; the processing node being further configured to:
   receive frames of point clouds at a processing node of a distributed computing platform;
   determine, from the frames, first frames in which first distances among the first frames exceed a given threshold;
   determine, as key frames, the first frames and a second subset of second frames, wherein:
      each of the second frames comprise at least a common feature as present in the first frames, the common feature in the second frames being at a higher resolution compared to that in the first frames; and
   allocate tasks of processing the key frames to processing subnodes based at least in part on estimated processing demands of the key frames and processing capabilities of each of the processing subnodes.

19. The apparatus of claim 18, wherein the allocating of tasks comprises:
   allocating key frames having a first range of timestamps to a first processing subnode; and
   allocating second key frames having a second range of timestamps to a second processing subnode.

20. The apparatus of claim 18, wherein the determination of the key frames comprises determining a frame to be a key frame in response determining that a position corresponding to a capture of the frame deviates from positions corresponding to captures of remaining frames by more than a threshold distance.

\* \* \* \* \*